(12) United States Patent
Mehta et al.

(10) Patent No.: US 7,683,129 B2
(45) Date of Patent: *Mar. 23, 2010

(54) FILMS FROM POLYMER BLENDS

(75) Inventors: Aspy K. Mehta, Humble, TX (US); Sudhin Datta, Houston, TX (US); Wen Li, Houston, TX (US); Srivatsan Srinivas Iyer, Pearland, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1021 days.

This patent is subject to a terminal disclaimer.

(21) Appl. No.: 11/299,104

(22) Filed: Dec. 9, 2005

(65) Prior Publication Data

US 2006/0178483 A1 Aug. 10, 2006

Related U.S. Application Data

(60) Provisional application No. 60/637,429, filed on Dec. 17, 2004, provisional application No. 60/655,310, filed on Feb. 22, 2005.

(51) Int. Cl.
*C08L 23/00* (2006.01)
*C08L 23/04* (2006.01)
*D04H 1/00* (2006.01)
*D04H 3/00* (2006.01)
*D04H 5/00* (2006.01)
*B32B 25/02* (2006.01)

(52) U.S. Cl. .................... 525/191; 525/240; 428/292.1; 428/441; 428/461; 428/511; 428/516

(58) Field of Classification Search ................ 525/191, 525/240; 428/292.1, 441, 461, 511, 516
See application file for complete search history.

(56) References Cited

U.S. PATENT DOCUMENTS

| | | | |
|---|---|---|---|
| 3,262,992 A | 7/1966 | Holzer et al. | |
| 3,378,606 A | 4/1968 | Kontos | |
| 3,853,969 A | 12/1974 | Kontos | |
| 3,882,197 A | 5/1975 | Fritz et al. | |
| 3,888,949 A | 6/1975 | Shih | |
| 4,461,872 A | 7/1984 | Su | |
| 4,665,130 A | 5/1987 | Hwo | |
| 4,921,749 A | 5/1990 | Bossaert et al. | |
| 5,079,273 A | 1/1992 | Kuroda et al. | |
| 5,171,628 A | 12/1992 | Arvedson et al. | |
| 5,213,744 A | 5/1993 | Bossaert | |
| 5,290,635 A | 3/1994 | Matsumura et al. | |
| 5,298,561 A | 3/1994 | Cecchin et al. | |
| 5,331,047 A | 7/1994 | Giacobbe | |
| 5,453,318 A | 9/1995 | Giacobbe | |
| 5,504,172 A | 4/1996 | Imuta et al. | |
| 5,652,308 A | 7/1997 | Merrill et al. | |
| 5,723,217 A | 3/1998 | Stahl et al. | |
| 5,726,103 A | 3/1998 | Stahl et al. | |
| 5,736,465 A | 4/1998 | Stahl et al. | |
| 5,763,080 A | 6/1998 | Stahl et al. | |
| 5,891,814 A | 4/1999 | Richeson et al. | |
| 5,910,362 A | 6/1999 | Aratake et al. | |
| 5,959,006 A | 9/1999 | Pungtrakul | |
| 5,994,482 A | 11/1999 | Georgellis et al. | |
| 6,010,588 A | 1/2000 | Stahl et al. | |
| 6,017,615 A | 1/2000 | Thakker et al. | |
| 6,080,818 A | 6/2000 | Thakker et al. | |
| 6,096,420 A | 8/2000 | Wilhoit et al. | |
| 6,143,818 A | 11/2000 | Wang et al. | |
| 6,153,703 A | 11/2000 | Lustiger et al. | |
| 6,165,599 A | 12/2000 | Demeuse | |
| 6,187,449 B1 | 2/2001 | Sasaki et al. | |
| 6,342,565 B1 | 1/2002 | Cheng et al. | |
| 6,388,013 B1 | 5/2002 | Saraf et al. | |
| 6,476,135 B1 | 11/2002 | Bugada et al. | |
| 6,500,563 B1 | 12/2002 | Datta et al. | |
| 6,503,588 B1 | 1/2003 | Hayashi et al. | |
| 6,525,157 B2 | 2/2003 | Cozewith et al. | |
| 6,531,214 B2 | 3/2003 | Carter et al. | |
| 6,583,076 B1 | 6/2003 | Pekrul et al. | |
| 6,635,715 B1 | 10/2003 | Datta et al. | |
| 6,642,316 B1 | 11/2003 | Datta et al. | |
| 6,747,114 B2 | 6/2004 | Karandinos et al. | |
| 6,750,284 B1 | 6/2004 | Dharmarajan et al. | |

(Continued)

FOREIGN PATENT DOCUMENTS

EP 373 660 6/1990

(Continued)

OTHER PUBLICATIONS

Collette, John W. et al., Journal of Macromolecules, vol. 22, 1989,"Elastomeric Polypropylenes from Alumina-Supported Tetraalkyl Group IVB Catalysts. 1. Synthesis and Properties of High Molecular Weight Stereoblock Homopolymers", pp. 3851-3858 and 2. Chain Microstructure, Crystallinity, and Morphology, pp. 3858-3866.

*Primary Examiner*—Nathan M Nutter
(74) *Attorney, Agent, or Firm*—Catherine L. Bell; Darryl M. Tyus; Robert L. Abdon

(57) ABSTRACT

This invention relates to a film comprising a heterogeneous blend of: 1) from 60 to 99 wt % of one or more semi-crystalline polymers; and 2) from 1 to 40 wt % of one or more semi-amorphous polymers; where the blend has: an MFR of 0.5 to 100 dg/min, a haze of 20% or less, and a permanent set of greater than 65%; and where the film is 2.5 to 635 microns thick and has: a haze of 10% or less, a 1° Secant tensile modulus of 100,000 to 30,000 psi, an Elmendorf tear in the machine direction and transverse direction of 45 g/mil or more, a total energy impact of 3 J or more; and a 45 degree gloss of 82 or more.

77 Claims, 1 Drawing Sheet

U.S. PATENT DOCUMENTS

| | | | |
|---|---|---|---|
| 6,800,692 | B2 | 10/2004 | Farley et al. |
| 6,875,485 | B2 | 4/2005 | Kanai et al. |
| 6,887,941 | B2 | 5/2005 | Zhou |
| 6,900,147 | B2 | 5/2005 | Morman et al. |
| 6,906,160 | B2 | 6/2005 | Stevens et al. |
| 6,921,794 | B2 | 7/2005 | Cozewith et al. |
| 6,984,696 | B2 | 1/2006 | Curry et al. |
| 7,319,077 | B2 * | 1/2008 | Mehta et al. ............ 442/361 |
| 7,476,710 | B2 * | 1/2009 | Mehta et al. ............ 525/191 |
| 2002/0147286 | A1 | 10/2002 | Resconi et al. |
| 2003/0213938 | A1 | 11/2003 | Farley et al. |
| 2004/0122388 | A1 | 6/2004 | McCormack et al. |
| 2005/0106978 | A1 | 5/2005 | Cheng et al. |

FOREIGN PATENT DOCUMENTS

| | | |
|---|---|---|
| EP | 374 695 | 6/1990 |
| EP | 400 333 | 12/1990 |
| EP | 462 574 | 12/1991 |
| EP | 629 631 | 12/1994 |
| EP | 629 632 | 12/1994 |
| EP | 1 002 814 | 5/2000 |
| EP | 1 003 814 | 5/2000 |
| EP | 1 223 191 | 7/2002 |
| EP | 1 505 181 | 2/2005 |
| GB | 2 061 339 | 5/1981 |
| WO | WO 94/28042 | 12/1994 |
| WO | WO 99/07788 | 2/1999 |
| WO | WO 99/19547 | 4/1999 |
| WO | WO 00/00564 | 1/2000 |
| WO | WO 00/01745 | 1/2000 |
| WO | WO 00/01766 | 1/2000 |
| WO | WO 00/69963 | 11/2000 |
| WO | WO 00/69965 | 11/2000 |
| WO | WO 00/70134 | 11/2000 |
| WO | WO 01/48034 | 7/2001 |
| WO | WO 02/083753 | 10/2002 |
| WO | WO 03/021569 | 3/2003 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 04/035681 | 4/2004 |
| WO | WO 2004/035681 | 4/2004 |
| WO | WO 2004/060994 | 7/2004 |
| WO | WO 2005/052052 | 6/2005 |

* cited by examiner

20% of 14.5% $C_2$ SAPEC in PP
Field of view: 5 μm x 5 μm

FILMS FROM POLYMER BLENDS

PRIORITY CLAIM

This application claims the benefit of U.S. Ser. No. 60/637,429, filed Dec. 17, 2004 and U.S. Ser. No. 60/655,310 filed Feb. 22, 2005.

STATEMENT OF RELATED CASES

This application is related to U.S. Ser. No. 10/716,306, filed Nov. 18, 2003. This invention is also related to copending U.S. application Ser. No. 10/402,275 filed Mar. 28, 2003.

FIELD OF THE INVENTION

This invention relates to heterogeneous polymer blends and films made therefrom.

BACKGROUND

Isotactic polypropylene and ethylene/propylene copolymers are often used in the industry to produce articles such as fibers, films, molded parts and nonwoven fabrics. Additionally, blending these polymers with other polymers has also been the subject of past endeavors.

For example, U.S. Pat. No. 3,262,992 suggests the addition of a stereoblock copolymer of ethylene and propylene (having high crystalline melting points) to isotactic polypropylene leads to improved mechanical properties of the blend compared to isotactic polypropylene alone.

U.S. Pat. Nos. 3,853,969 and 3,378,606, suggest the formation of in situ blends of isotactic polypropylene and "stereo block" copolymers of propylene and another olefin of 2 to 12 carbon atoms, including ethylene and hexene.

U.S. Pat. No. 3,882,197 suggests blends of stereoregular propylene/alpha-olefin copolymers, stereoregular propylene, and ethylene copolymer rubbers.

U.S. Pat. No. 3,888,949 suggests the synthesis of blend compositions containing isotactic polypropylene and copolymers of propylene and an alpha-olefin, containing between 6-20 carbon atoms, which have improved elongation and tensile strength over either the copolymer or isotactic polypropylene. Copolymers of propylene and alpha-olefin are described wherein the alpha-olefin is hexene, octene or dodecene.

U.S. Pat. No. 4,461,872, discloses a blend produced in part by the use of another heterogeneous catalyst system which is expected to form copolymers which have statistically significant intramolecular and intermolecular compositional differences.

Two publications in the Journal of Macromolecules, 1989, volume 22, pages 3851-3866 describe blends of isotactic polypropylene and partially atactic polypropylene which purportedly have desirable tensile elongation properties.

U.S. Pat. Nos. 5,723,217; 5,726,103; 5,736,465; 5,763,080; and 6,010,588 suggest several metallocene catalyzed processes to make polypropylene to produce fibers and fabric. U.S. Pat. No. 5,891,814, discloses a dual metallocene-generated propylene polymer used to make spunbond fibers. WO 99/19547 discloses a method for producing spunbonded fibers and fabric derived from a blend of a propylene homopolymer and a copolymer of polypropylene.

U.S. Pat. No. 6,342,565 and its equivalent WO 00/070134 disclose, at Table 4, column 24, fibers comprising 80, 90, and 95 weight % of Achieve 3854 and 20, 10 and 5 weight %, respectively of a propylene/ethylene copolymer having 13.5% ethylene and an ML of 12. These particular blends are not made into films, molded articles or non-woven materials. The fibers in Table 4 are reported to be inelastic and are unsuitable in the elastic applications desired in U.S. Pat. No. 6,342,565.

U.S. Pat. No. 6,525,157; U.S. Pat. No. 5,504,172; and WO 00/01745 disclose various propylene/ethylene copolymers. US 2003/0130430 discloses blends of two different propylene/ethylene copolymers. U.S. Pat. No. 6,642,316, WO00/070134, WO 00/01766, U.S. Pat. No. 6,500,563; U.S. Pat. No. 6,342,565, U.S. Pat. No. 6,500,563 and WO 00/69963 disclose elastic blends of crystalline polypropylene and propylene/ethylene copolymers. U.S. Pat. No. 6,153,703 discloses blends of semicrystalline copolymers and propylene ethylene polymers having very high toughness without loss in modulus. EP 0 629 632 and EP 0 629 631 disclose blends of polypropylene and ethylene-propylene copolymers having certain triad tacticities and proportions of inversely inserted propylene units.

U.S. Pat. No. 6,635,715 and its equivalents EP 1 003 814 B1 and WO 99/07788 disclose blends of polypropylene and Escorene 4292 with propylene/ethylene copolymers for use as thermoplastic elastomers.

EP 0 374 695 A1 discloses visually homogeneous blends of an ethylene-propylene copolymer and Profax™ 6331 by Basell.

U.S. Pat. No. 6,750,284 discloses thermoplastic membranes comprising propylene-ethylene copolymers and up to 40 wt % polypropylene.

WO 03/040095, WO 03/040201, WO 03/040233, and WO 03/040442 disclose various propylene-ethylene copolymers made with non-metallocene catalyst compounds. WO 03/040202 discloses films and sealants made from the propylene-ethylene copolymers made with non-metallocene catalyst compounds.

Additional references of interest include WO 94/28042, EP 1 002 814, WO 00/69965, WO 01/48034, WO04035681A2, EP 0 400 333 B1, EP 0 373 660 B1, WO04060994A1, U.S. Pat. No. 5,453,318, U.S. Pat. No. 5,298,561, and U.S. Pat. No. 5,331,047.

This invention is also related to copending U.S. application Ser. No. 10/402,275 filed Mar. 28, 2003.

However, none of the above disclose blends having a balanced set of properties comprising toughness, flexibility and clarity while still maintaining good crystallizability for convenient fabrication under polypropylene conditions.

SUMMARY

This invention relates to a film comprising a heterogeneous blend comprising:

1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less (preferably 50 dg/min or less); and 2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and/or C4 to C10 alpha-olefin comonomers, said semi-amorphous polymers each having:

a) a heat of fusion of 4 to 70 J/g; and
b) a melt flow rate of 0.1 to 200 dg/min (preferably 50 dg/min. or less); and
c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
d) an Mw/Mn of 1.5 to 4, and
e) a propylene triad tacticity, as measured by $^{13}$C NMR, of 75% or greater, where the blend has:
i) a melt flow rate of 0.1 to 50 dg/min (preferably 0.1 to 20 dg/min); and
ii) less than 5 weight % filler, based upon the weight of the polymers and the filler,
iii) a haze of 20% or less as measured on a 1 mm thick injection molded chip, and
iv) a permanent set of greater than 65%; and where the film is 0.1 to 25 mil (2.5 to 635 micron) thick and has:
a haze of 10% or less, and
a 1° Secant tensile modulus of from about 100,000 psi to about 30,000 psi (690 MPa to 207 MPa), and
an Elmendorf tear in the machine direction of 45 g/mil or more (1.77 g/micron or more), and
an Elmendorf tear in the transverse direction of 45 g/mil or more (1.77 g/micron or more), and
a total energy impact of 3 ft.lb or more (4.0 J or more), and
a 45 degree gloss of 82 units or more.

In a preferred embodiment, the blend of the semi-crystalline and semi-amorphous polymers is a heterogeneous blend, preferably where the semi-crystalline polymer is the continuous phase and the semi-amorphous polymer is the discontinuous phase.

By heterogeneous blend is meant a composition having two or more morphological phases in the same state. For example a blend of two polymers where one polymer forms discrete packets dispersed in a matrix of another polymer is said to be heterogeneous in the solid state. Also heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM), in the event the SEM and AFM provide different data, then the SEM shall be used. By continuous phase is meant the matrix phase in a heterogeneous blend. By discontinuous phase is meant the dispersed phase in a heterogeneous blend.

By homogeneous blend is meant a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on the DMTA trace. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous.

DETAILED DESCRIPTION

Figure 1:
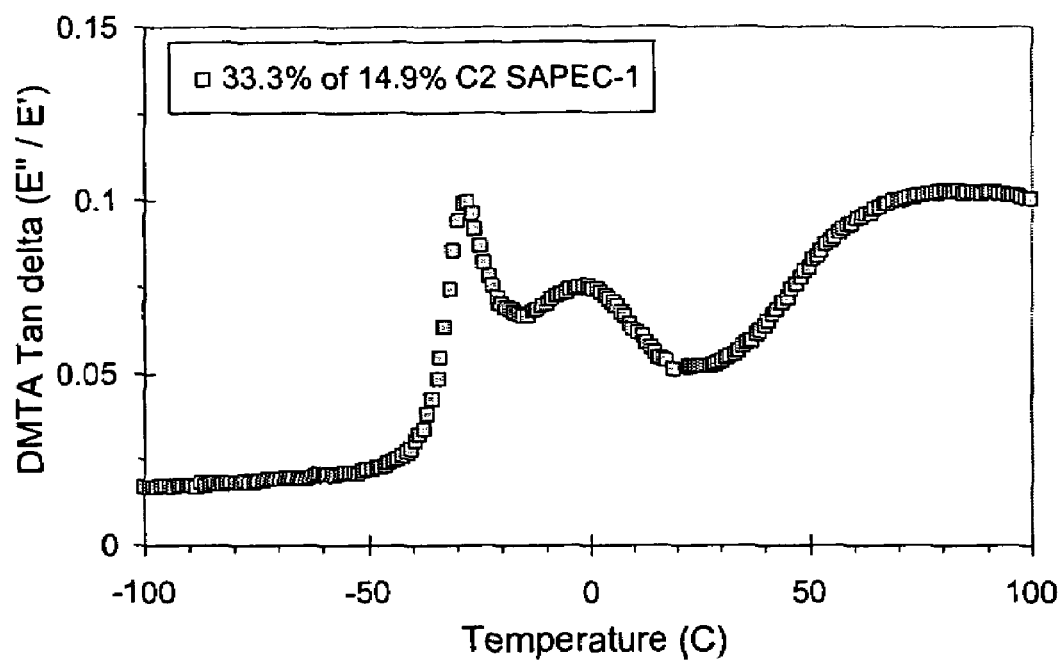
FIG. 1 is a plot of Dynamic Mechanical Thermal Analysis (DMTA) Testing of a blend similar to Example 3-3. It is a plot of tan δ vs Temperature for a blend composition comprising 33.3 wt % of a semi-amorphous propylene-ethylene copolymer, containing 14.9 wt % ethylene, with 66.7 wt % of a semi-crystalline propylene homopolymer.

For purposes of this invention and the claims thereto, the term copolymers means any polymer comprising two or more monomers. For the purposes of this invention and the claims thereto when a polymer is referred to as comprising a monomer, the monomer present in the polymer is the polymerized form of the monomer. Likewise when catalyst components are described as comprising neutral stable forms of the components, it is well understood by one of ordinary skill in the art, that the active form of the component is the form that reacts with the monomers to produce polymers.

The new notation numbering scheme for the Periodic Table Groups is used herein as set out in CHEMICAL AND ENGINEERING NEWS, 63(5), 27 (1985).

As used herein, the term film applies to fabricated articles, extruded or otherwise, that have the thickness as the dominant dimension and where the thickness is uniform and in the range 0.1 to 25 mil (2.5 to 635 μm). The film can be a monolayer or part of a combination of layers (multilayer). A monolayer or multilayer film can be laminated, by extrusion lamination or other means, to other monolayer or multilayer films. The films can be prepared by any fabricating mode recognized in the industry, such as film casting or film blowing.

As used herein, the term "polypropylene", "propylene polymer," or "PP" refers to homopolymers, copolymers, terpolymers, and interpolymers, comprising from 50 to 100 weight % of propylene.

As used herein, the term "reactor grade" refers to polyolefin resin whose molecular weight distribution (MWD), or polydispersity, has not been substantially altered after polymerization, except for pelletizing with an antioxidant. The term particularly includes polyolefins which, after polymerization, have not been treated, or subjected to treatment, to substantially reduce viscosity or substantially reduce average molecular weight.

As used herein, "metallocene" means one or more compounds represented by the formula $Cp_mMR_nX_q$, wherein Cp is a cyclopentadienyl ring which may be substituted, or derivative thereof (such as indene or fluorene) which may be substituted; M is a Group 4, 5, or 6 transition metal, for example titanium, zirconium, hafnium, vanadium, niobium, tantalum, chromium, molybdenum and tungsten; R is a substituted or unsubstituted hydrocarbyl group or hydrocarboxy group having from one to 20 carbon atoms; X may be a halide, a hydride, an alkyl group, an alkenyl group or an arylalkyl group; and m=1-3; n=0-3; q=0-3; and the sum of m+n+q is equal to the oxidation state of the transition metal, further if m is 2 or 3 then any two Cp groups may be bound to one another through a bridging group T, which is typically a group 14 atom which may be substituted with one or two hydrocarbyl groups (a preferred example includes $(CH_3)_2$—Si), if m is 1 then the Cp group may be bound to R via a bridging group T which is typically a group 14 atom which may be substituted with one or two hydrocarbyl groups (a preferred example includes $(CH_3)_2$—Si).

Abbreviations may be used including: Me=methyl, Et=ethyl, Bu=butyl, Ph=phenyl, Cp=cyclopentadienyl, Cp*=pentamethyl cyclopentadienyl, Ind=indenyl, and Flu=fluorene.

As used herein, "support" or "support composition" refers to compounds that are particulate and porous that may optionally be calcined or contacted with a halogen. For example, a fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

As used herein, "metallocene catalyst system" is the product of contacting components: (1) one or more metallocenes; (2) one or more activators; and (3) optionally, one or more support compositions. Preferred activators include alumoxanes (including methylalumoxane and modified-methylalumoxane), stoichiometric activators, ionic activators, non-co-ordinating anions and the like.

As used herein "semi-crystalline polymer" is defined to be an olefin polymer having a melting point (Tm) of 100° C. or more (as measured by DSC-second melt, described below). As used herein a "semi-amorphous polymer" is defined to be an olefin polymer having a heat of fusion of between 4 and 70 J/g (as determined by DSC, described below). Melting point (Tm), peak crystallization temperature (Tc), heat of fusion (Hf) and percent crystallinity are determined using the following procedure according to ASTM E 794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For the semi-crystalline polymers, having appreciable crystallinity, the melting temperature is typically measured and reported during the second heating cycle (or second melt). For the semi-amorphous polymers, having comparatively low levels of crystallinity, the melting temperature is typically measured and reported during the first heating cycle. Prior to the DSC measurement, the sample is aged (typically by holding it at ambient temperature for a period up to about 5 days) or annealed to maximize the level of crystallinity.

As used herein, molecular weight (Mn and Mw) and molecular weight distribution (MWD or Mw/Mn) are determined by gel permeation chromatography using polystyrene standards. The GPC data were taken on a Waters 150 GPC using three Shodex mixed bed AT-80M/S columns. The solvent used was 1,2,4 trichlorobenzene that contains 300 ppm of the antioxidant Santonox R. The run conditions were an operating temperature of 145 C, a nominal flow rate of 1.0 ml/min and a 300 μL injection volume. Solutions for injection were typically 1.0 to 1.5 mg/ml. The columns were calibrated by running a series of narrow molecular weight polystyrene (PS) standards and recording their retention volumes. Polypropylene (PP) molecular weight values were calculated using the "universal calibration" approach and the following Mark-Houwink coefficients:

|    | k (dL/g)              | a    |
|----|-----------------------|------|
| PS | $1.75 \times 10^{-4}$ | 0.67 |
| PP | $8.33 \times 10^{-5}$ | 0.80 |

A third order fit is used to fit the Log (MW) vs Retention volume points. The data were taken and analyzed by Waters Millenium software.

A clarifying agent is defined to be any agent that causes at least a 10%, preferably at least 15%, more preferably at least 20% reduction in haze (as measured on a 1 mm molded chip according to ASTM D 1003) as compared to the same composition without the clarifying agent. A nucleating agent is often a clarifying agent. A nucleating agent is defined to be an additive which forms nuclei in a polymer melt to promote the growth of crystals (adipic acid, benzoic acid, or metal salts of these acids, sorbitols, such as 3,4-dimethylbenzylidene sorbitol are examples of nucleating agents, as are many inorganic fillers).

Blend Components-Semi-Crystalline Polymer

In a preferred embodiment, the blends of this invention comprise from 60 to 99 weight percent of one or more semi-crystalline polymers (based upon the weight of the semi-crystalline and semi-amorphous polymers), preferably from 60 to 90 weight %, preferably from 60 to 85 weight %, preferably from 60 to 75 weight %, each semi-crystalline polymer comprising propylene and from 0 to 5 weight % alpha-olefin comonomer (based upon the weight of the polymer), preferably from 0.1 to 4 weight %, preferably from 0.25 to 3 weight %. Preferably the alpha olefin comonomer is a C2 to C10 alpha olefin, preferably selected from the group consisting of ethylene, butene, pentene, hexene, heptene, octene, nonene, and decene, preferably ethylene, butene, hexene, and octene, preferably ethylene. (For purposes of this invention when a copolymer is described as comprising propylene and one or more C2 to C10 olefins, or alpha olefins, the C2 to C10 olefins or alpha olefins do not include C3 e.g. propylene.)

Preferred semi-crystalline polymers have a melting point (Tm−second melt as measured by DSC as described above) between 100 and 170° C., preferably between 110 and 170° C., preferably between 125 and 170° C.

Preferred semi-crystalline polymers have a melt flow rate of from 0.1 to 200 dg/min, preferably 0.25 to 100 dg/min, preferably from 0.5 to 50 dg/min, preferably 0.5 to 20 dg/min, preferably 1 to 20 dg/min (ASTM 1238-D, 2.16 kg, 230° C.).

Preferred semi-crystalline polymers have an Elongation at Break of 700% or less, preferably 300 to 700%, as measured by ASTM D 638, 2 in/min 50 mm/min on a 0.125 in (3.18 mm) thick injection molded sample).

Preferred semi-crystalline polymers have a 1° Secant Flexural Modulus of from 100,000 psi to 250,000 psi (690 to 1720 MPa), preferably from 150,000 psi to 250,000 psi (1035 to 1720 MPa) as measured by ASTM D-790A (0.05 in/min 1.3 mm/min). "High-crystallinity polypropylenes," e.g. those having values above 250,000 psi (1720 MPa) can also be used.

Any propylene polymer having 0 to 5 weight % comonomer, a melting point between 100 and 170, and an MFR of 200 dg/min or less may be used in the practice of this invention. Suitable examples include polymers produced by Ziegler-Natta catalyst systems, metallocene systems, and the like. The polymers may be produced by any means including solution, slurry, gas phase, supercritical or high pressure. In a particularly preferred embodiment the propylene polymers useful herein have a molecular weight distribution (Mw/Mn) of 5 or less preferably between 1.5 and 4 preferably between 1.5 and 3. In another preferred embodiment, preferred propylene polymers useful herein include those produced by metallocene catalyst systems. In another embodiment preferred propylene polymers useful herein include those having a composition distribution breadth index (CDBI) of 60% or more, preferably 70% or more, preferably 80% or more, preferably 90% or more. (CDBI is measured as described in WO 93/03093, with the modification that any fractions having a weight average molecular weight (Mw) below 25,000 g/mol are disregarded.) Preferred propylene polymers that can be used in the practice of this invention include those propylene polymers sold by ExxonMobil Chemical Company under the tradename ACHIEVE™. Particularly useful grades include ACHIEVE™ 3854, ACHIEVE™ 1654E1, ACHIEVE™ 3825, ACHIEVE™ 1605, available from ExxonMobil Chemical Company in Houston, Tex. Additional preferred propylene polymers useful in the practice of this invention include those propylene homopolymers, and random copolymers available from ExxonMobil Chemical Company under the grade names: PP1024E4, PP1042, PP1032, PP1044, PP1052, PP1105E1, PP3155 and PP9852E1, PP9272, PP9513, PP9544, PP9562. In some instances impact copolymers can be utilized in the practice of this invention. Several are available from ExxonMobil Chemical Company (e.g. PP7032 E2).

In another embodiment preferred semi-crystalline polymers useful herein have a melting point greater than 110° C., preferably greater than 115° C., and most preferably greater than 130° C. and/or a heat of fusion of greater than 60 J/g, preferably at least 70 J/g, preferably at least 80 J/g, as determined by DSC analysis described above.

The molecular weight of the semi-crystalline polymer can be between 10,000 to 5,000,000 g/mol, alternatively 50,000 to 500,000 g/mol, preferably with a polydispersity index (PDI–Mw/Mn) between 1.5 to 4, preferably 1.5 to 3.

Preferred semi-crystalline polymers may be isotactic, highly isotactic, syndiotactic, or highly syndiotactic. In one embodiment, the semi-crystalline polymer is an isotactic polypropylene. In another embodiment, the semi-crystalline polymer is a highly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, a polypropylene homo- or co-polymer having at least 85% isotacticity is the semi-crystalline polymer. In another embodiment, the semi-crystalline polymer has at least 90% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In a desirable embodiment, a polypropylene homo- or co-polymer having at least 85% syndiotacticity is the semi-crystalline polymer. In another embodiment, a propylene homo- or co-polymer having at least 90% syndiotacticity is the semi-crystalline polymer.

Blend Components-Semi-Amorphous Polymer

In a preferred embodiment, blends of this invention comprise from 1 to 40 weight percent of one or more semi-amorphous polymers (based upon the weight of the semi-crystalline and semi-amorphous polymers), preferably from greater than 10 to 40 weight %, preferably from 15 to 40 weight %, preferably from 25 to 40 weight %. In some embodiments, the semi-amorphous polymers comprise propylene and from 10 to 25 weight % of one or more C2 to C10 alpha-olefin comonomers, preferably from 10 to 20 weight %, preferably from 12 to 20 weight %, based upon the weight of the copolymer. Preferably the alpha olefin comonomer is a C2 to C10 alpha olefin selected from the group consisting of ethylene, butene, pentene, hexene, heptene, octene, nonene, and decene, preferably ethylene, butene, hexene, and octene, preferably ethylene.

The ethylene content of the semi-amorphous polymers can be measured as follows. A thin homogeneous film is pressed at a temperature of about 150° C. or greater, then mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045 X$^2$, wherein X is the ratio of the peak height at 1155 cm$^{-1}$ and peak height at either 722 cm$^{-1}$ or 732 cm$^{-1}$, whichever is higher.

Preferred semi-amorphous polymers having from 10 to 25 weight % comonomers useful in this invention preferably have a percent crystallinity of 2.5 to 25%, preferably from 5 to 23%, preferably from 5 to 20%. Percent crystallinity is determined according to the DSC procedure described above.

Preferred semi-amorphous polymers useful in this invention preferably have a melt flow rate of 0.1 to 200 dg/min, preferably 0.1 to 100 dg/min, preferably 0.5 to 50, preferably 1 to 25, preferably 1 to 20 dg/min (as measured by ASTM 1238, 2.16 kg and 230° C.).

Preferred semi-amorphous polymers useful in this invention preferably have a DSC melting point (Tm) of 105° C. or less, preferably 90° C. or less, preferably between 25 and 90° C., preferably between 30 and 80° C., preferably between 35 and 75° C., as measured by the DSC procedure described above.

Preferred semi-amorphous polymers useful in this invention preferably have an intermolecular composition distribution of 75% or more, preferably 80% or more, preferably 85% or more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative), preferably 10% (relative), of the average weight % comonomer of the copolymer. The fractions are obtained at temperature increases of approximately 8 C between stages. The intermolecular composition distribution of the copolymer is determined by thermal fractionation in hexane as follows: about 30 grams of the semi-amorphous polymer is cut into small cubes of about ⅛ inch (0.32 cm) on the side and is then introduced into a thick walled glass bottle closed with screw cap along with 50 mg of Irganox1076, an antioxidant commercially available from Ciba-Geigy Corporation. Then, 425 ml of hexane (a principal mixture of normal and iso isomers) is added to the contents of the bottle and the sealed bottle is maintained at about 23° C. for 24 hours. At the end of this period, the solution is decanted and the residue is treated with additional hexane for an additional 24 hours at 23° C. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the semi-amorphous polymer soluble at 40° C., 48° C., 55° C., and 62° C. are obtained at temperature increases of approximately 8° C. between stages. The soluble polymers are dried, weighed and analyzed for composition, as wt % ethylene content. To produce a copolymer having the desired narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

Preferred semi-amorphous polymers useful in this invention preferably have a molecular weight distribution (Mw/Mn) of Mw/Mn of less than 5, preferably between 1.5 and 4, preferably between 1.5 and 3.

In another embodiment polymers that are useful in this invention as semi-amorphous polymers include homopolymers and random copolymers of propylene having a heat of fusion as determined by Differential Scanning Calorimetry (DSC) of less than 70 J/g, an MFR of 50 dg/min or less, and contain stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 10 wt % to 25 wt % polymerized ethylene units, based on the total weight of the polymer; has a narrow intermolecular composition distribution (e.g. 75% or more by thermal fractionation); has a melting point (Tm) of from 25° C. to 120° C., or from 35° C. to 80° C.; has a heat of fusion within the range having an upper limit of 70 J/g or 25 J/g and a lower limit of 1 J/g or 3 J/g; has a molecular weight distribution Mw/Mn of from 1.8 to 4.5; and has a melt flow rate of less than 40 dg/min, or less than 20 dg/min (as measured at 230° C., and 2.16 kg, ASTM 1238).

A particularly preferred polymer useful in the present invention as a semi-amorphous polymer is a polymer with a moderate level of crystallinity due to stereoregular propylene sequences. The polymer can be: (A) a propylene homopolymer in which the crystallinity is disrupted in some manner such as by regio-inversions and stereo defects; (B) a random propylene copolymer in which the propylene crystallinity is disrupted at least in part by comonomers; or (C) a combination of (A) and (B).

In one embodiment, the useful polymers described above further include a non-conjugated diene monomer to aid in later chemical modification of the blend composition (such as crosslinking). The amount of diene present in the polymer is preferably less than 10% by weight, and more preferably less than 5% by weight. The diene may be any non-conjugated diene which is commonly used in ethylene propylene copolymers including, but not limited to, ethylidene norbornene, vinyl norbornene, and dicyclopentadiene.

In one embodiment, the semi-amorphous polymer is a random propylene copolymer having a narrow composition distribution. In another embodiment, the semi-amorphous polymer is a random propylene copolymer having a narrow composition distribution and a melting point of from 25° C. to 120° C., preferably 25° C. to 90° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intermolecular composition distribution (i.e., randomness) of the copolymer may be determined by $^{13}$C NMR, which locates the comonomer residues in relation to the neighboring propylene residues. The intermolecular composition distribution of the copolymer is determined by thermal fractionation in hexane as previously described.

In another embodiment, semi-amorphous polymers useful herein have a heat of fusion of 70 J/g or less, as determined by DSC described above, preferably from 1 to 65 J/g, preferably from 2 to 50 J/g, preferably from 4 to 45 J/g.

In another embodiment, semi-amorphous polymers useful herein have a weight average molecular weight of from 20,000 to 1,000,000, preferably from 50,000 to 500,000, preferably from 125,000 to 400,000 g/mol.

Preferred semi-amorphous polymers used in embodiments of the present invention have a propylene tacticity index (m/r) ranging from a lower limit of 4 or 6 to an upper limit of about 8, 10, or 12. The propylene tacticity index, expressed herein as "m/r", is determined by $^{13}$C nuclear magnetic resonance (NMR). The propylene tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the preferred semi-amorphous polymers have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred semi-amorphous polymers useful in this invention have a triad tacticity of three propylene units, as measured by $^{13}$C NMR, of 75% or greater, 80% or greater, 82% or greater, 85% or greater, or 90% or greater. The triad tacticity of a polymer is the relative tacticity of a sequence of three adjacent propylene units, a chain consisting of head to tail bonds, expressed as a binary combination of m and r sequences. It is usually expressed for semi-amorphous copolymers of the present invention as the ratio of the number of units of the specified tacticity to all of the propylene triads in the copolymer. The triad tacticity (mm fraction) of a propylene copolymer can be determined from a $^{13}$C NMR spectrum of the propylene copolymer and the following formula:

$$mm\ \text{Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

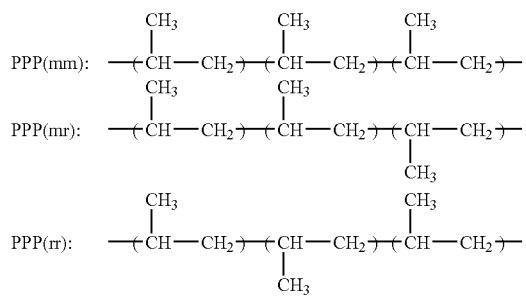

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP (mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

In another embodiment polymers that are useful in this invention as semi-amorphous polymers include homopolymers and random copolymers of propylene having a heat of fusion as determined by Differential Scanning Calorimetry (DSC) of less than 70 J/g, an MFR of 50 dg/min or less, and contain stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 10 wt % to 25 wt % polymerized ethylene units, based on the total weight of the polymer; has a narrow intermolecular composition distribution (e.g. 75% or more); has a melting point (Tm) of from 25° C. to 120° C., or from 35° C. to 80° C.; has a heat of fusion within the range having an upper limit of 70 J/g or 25 J/g and a lower limit of 1 J/g or 3 J/g; has a molecular weight distribution Mw/Mn of from 1.8 to 4.5; and has a melt flow rate of less than 40 dg/min, or less than 20 dg/min (as measured at 230° C., and 2.16 kg, ASTM D-1238).

Preferred polymers useful as semi-amorphous copolymers in this invention are also those polymers described in detail as the "Second Polymer Component (SPC)" in WO 00/69963, WO 00/01766, WO 99/07788, WO 02/083753, and described in further detail as the "Propylene Olefin Copolymer" in WO 00/01745, all of which are fully incorporated by reference herein.

Preferred semi-amorphous copolymers may be produced in a solution process using a metallocene catalyst as follows. In a preferred embodiment, a continuous solution polymerization process is used to produce copolymers of propylene and from 10 to 25 weight % ethylene preferably utilizing a metallocene catalyst, namely, 1,1'-bis(4-triethylsilylphenyl)methylene-(cyclopentadienyl)(2,7-di-tertiary-butyl-9-fluorenyl)hafnium dimethyl with dimethylaniliniumtetrakis-(pentafluorophenyl) borate as an activator. An organoaluminum compound, namely, tri-n-octylaluminum, may be added as a scavenger to the monomer feedstreams prior to introduction into the polymerization process. For preferred polymers, dimethylsilylbis(indenyl)hafnium dimethyl is used in combination with dimethylaniliniumtetrakis (pentafluorophenyl)borate. In other embodiments, dimethylsilyl bis(2-methyl-5-phenylindenyl) zirconium di alkyl (such as methyl) and or dimethylsilyl bis(2-methylindenyl)zirconium di alkyl (such as methyl) is used with an activator (dimethylaniliniumtetrakis(pentafluorophenyl)borate and or triaryl carbenium(pentafluorophenyl)borate). Preferably the solution polymerization is conducted in a single, or optionally in two, continuous stirred tank reactors connected in series with hexane used as the solvent. In addition, toluene may be added to increase the solubility of the co-catalyst. The feed is transferred to the first reactor at a reaction temperature between about 50° C. to about 220° C. Hydrogen gas may also be added to the reactors as a further molecular weight regulator. If desired, polymer product is then transferred to a second reactor, which is operated at a temperature between about 50° C. to 200° C. Additional monomers, solvent, metallocene catalyst, and activators can be fed to the second reactor.

Preferred semi-amorphous polymers may also be produced by the continuous solution polymerization process described in WO 02/34795, advantageously in a single reactor and separated by liquid phase separation from the alkane solvent. Preferred semi-amorphous polymers may also be produced by the polymerization process described at page 6 lines 24-57 of EP 1 003 814 B1.

Further detailed instructions on how to make such preferred semi-amorphous polymers can be found in WO 02/083754.

Preferred semi-amorphous polymers useful herein are made using a metallocene catalyst system.

Preferred semi-amorphous polymers include VM™1000, VM™2000, and VM™3000 available from ExxonMobil Chemical Company in Houston, Tex.

Blend Properties

Figure 2:
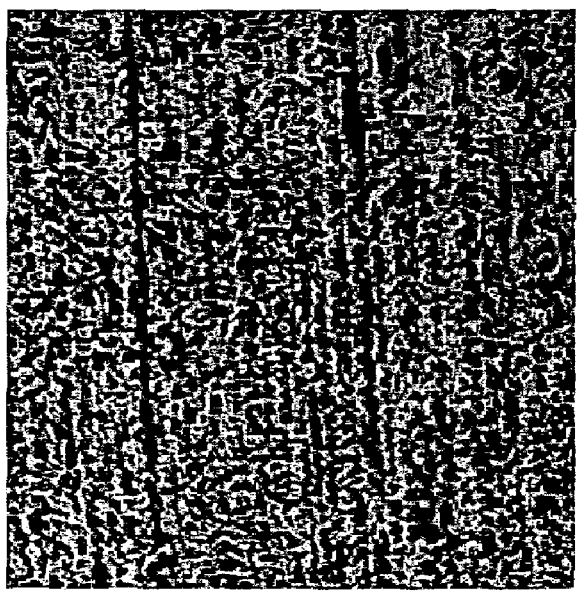
FIG. 2 is an AFM micrograph of a heterogeneous blend composition similar to that of Example 3-2. The blend comprises 20 wt % of a semi-amorphous propylene-ethylene copolymer containing 14.5 wt % ethylene, with 80 wt % of a semi-crystalline propylene homopolymer.

In a preferred embodiment, the blend described herein is heterogeneous, characterized by a fine dispersion of the discontinuous phase uniformly distributed in the matrix. The dimensions of the discontinuous phase in an article, depend on the product composition and on the fabricating mode used to prepare the article. For example, injection molding will introduce orientation along the flow direction causing some elongation of the dispersed phase particles. This can be observed in FIG. 2, which is an AFM micrograph of a heterogeneous blend composition comprising 20 wt % of a semi-amorphous propylene-ethylene copolymer, containing 14.5 wt % ethylene, with 80 wt % of a propylene homopolymer. In the figure, the flow direction is vertical. The dispersed phase (semi-amorphous propylene-ethylene copolymer) shows up dark in the micrograph, while the matrix (polypropylene) shows up light. Despite the orientation effect along the flow direction, FIG. 2 shows dispersed phase particles with the large dimension generally no greater than 1 μm (note that the field of view in FIG. 2 is 5 μm×5 μm). It is theorized that this feature of a fine dispersion contributes to achieving good clarity.

In a preferred embodiment, the blend of the semi-crystalline and semi-amorphous polymers is a heterogeneous blend, preferably where the semi-crystalline polymer is the continuous phase, and the semi-amorphous polymer is the discontinuous phase.

In another embodiment, depending on the composition, the blend could be heterogeneous with two phases, but the two phases could be co-continuous. In this case, it is not possible to definitively attribute one component to the matrix and the other to the dispersed phase, rather, both components share the matrix.

In another preferred embodiment the blend the film is prepared from is heterogeneous and has a haze below 20% (1 mm thick injection molded chip sample) and the film has an Elmendorf tear in the MD and TD of 45 g/mil or more and a total energy impact of 3 ft.lb or more (4.0 J or more).

The blends of the present invention can be prepared by any procedure that causes the intimate admixture of the components. This includes reactor blends, where the semi-crystalline polypropylene component is polymerized in one reactor (or one stage of one reactor) and the polymerized product is transferred to a different reactor or different stage of the same reactor, where polymerization of the semi-amorphous polymer occurs. The final blend product comprises an intimate mix of the two polymer components. Alternately, the blends can be prepared by post-reactor mixing of the semi-crystalline and semi-amorphous polymer components. For example, they may be blended in a tumbler, static mixer, batch mixer, extruder, or a combination thereof. The mixing step may take place as part of a processing method used to fabricate articles, such as in the extruder on an injection molding, machining or fiber line. Likewise, the components can be combined by melt pressing the components together on a Carver press to a thickness of 0.5 millimeter (20 mils) and a temperature of 180° C., rolling up the resulting slab, folding the ends together, and repeating the pressing, rolling, and folding operation 10 times. Internal mixers are particularly useful for solution or melt blending. Blending at a temperature of 180° C. to 240° C. in a Brabender Plastograph for 1 to 20 minutes has been found satisfactory. Still another method that may be used for admixing the components involves blending the polymers in a Banbury internal mixer above the flux temperature of all of the components, e.g., 180° C. for 5 minutes. A complete mixture of the polymeric components is indicated by the uniformity of the morphology of the dispersion of the semicrystalline polymer(s) and the semi-amorphous polymer(s). Continuous mixing may also be used. These processes are well known in the art and include single and twin screw mixing extruders, static mixers for mixing molten polymer streams of low viscosity, impingement mixers, as well as other machines and processes, designed to disperse the semi-crystalline polymer component and the semi-amorphous polymer component in intimate contact.

In a preferred embodiment, blend has dispersions of semi-amorphous polymer less than 4 μm in size in a continuous phase of semi-crystalline polymer, preferably the dispersions (also called dispersed particles) are 3 μm or less, preferably 2 μm or less, preferably 1 μm or less. (By dispersions less than 4 μm in size is meant that the average dispersion size is 4 μm or less).

The blends of the present invention preferably have a permanent tension set of 65% or more, preferably 85% or more, preferably 100% or more, preferably 125% or more, preferably 150% or more.

Permanent tension set is measured according to the following procedure. Hysteresis testing is done on molded samples having the required dumbbell geometry (ASTM designation type I bars for polypropylene), using the following test procedure. The deformable zone (2.54 cm long section) of the sample is stretched to 200% of its original length at a deformation rate of 20 in/min (51 cm/min) in an Instron (The Instron Corporation, Canton, Mass.) testing machine. The sample is then allowed to relax while the machine retracts and comes back to the point where the stress is zero. The machine resets the new zero elongation point at this position. With the specimen still within the grips, the second cycle is then initiated for another 200% extension. Again, the machine is allowed to come back to the point where the stress is zero on the retraction cycle. The set for each cycle is determined with reference to their respective zero elongation points. Two specimens are tested for each sample. The average of the set values over the two cycles is taken as the permanent tension set.

The blends of the present invention preferably have a haze of 20% or less, preferably 15% or less, preferably 12% or less, preferably 10% or less, as measured by ASTM D 1003 on a 1 mm thick injection molded haze chip sample provided that the blend in question is combined with 2500 ppm of bis(3,4 dimethylbenzylidene)sorbitol (also called DMDBS and is available as (Millad 3988 from Milliken Chemicals) prior to being molded into the 1 mm chip. While the inventive blends are combined with a clarifying agent for haze testing of the blend, the final films of the invention may or may not contain clarifying agent. Film haze is also measured according to ASTM-D 1003.

The blends of the present invention contain less than 5 wt % filler, based on the weight of the polymers and the filler.

In another embodiment, the blends of the present invention preferably have a melt flow rate (ASTM D-1238 Condition L; 230° C., 2.16 kg) of 0.1 to 200 dg/min, preferably 0.1 to 100 dg/min, preferably 0.5 to 50 dg/min, preferably 0.5 to 30 dg/min, preferably 1.0 to 25 dg/min.

In another embodiment, the heterogeneous blends of the present invention show surprisingly good blush resistance (ie. very low to no stress-whitening). Stress-whitening, or blushing, in heterogeneous propylene copolymers is caused by the formation of voids or crazes during the deforming of a specimen, upon application of stress. Light is diffracted from the crazes and voids giving rise to the whitening, which presents an undesirable appearance. The detailed test procedure to quantify the amount of stress whitening is discussed below. In essence, a molded part is impacted using a falling-weight impact tester. The impact of the tup weight induces stress-whitening, if the sample is susceptible. Color readings (Hunter color "L"; a measure of the black-white spectrum) are taken on the molded specimen, at the impact area and outside the impact area. The degree of stress whitening is judged as the difference between the Hunter "L" color readings of the two measurements. In other words ΔL is determined, where ΔL is defined as Hunter "L" value of impact area minus Hunter "L" value of non-impact area. In one embodiment, the heterogeneous blends of the present invention show ΔL less than 25, preferably less than 20, preferably less than 15, preferably less than 10, preferably less than 5. In another embodiment, the blends of the present invention show negative ΔL values (ie. Hunter "L" value for impact area is less than Hunter "L" value for non-impact area).

Stress Whitening Test Procedure: An injection molded ASTM specimen (e.g. Gardner disk), 125 mil (3.18 mm) thick, is impacted with a 4 lb (1.82 kg) weight from a height of 5 in (ie. 20 in.lb or 2.26 J), using a falling-weight impact tester. The impact of the tup weight is utilized to induce stress-whitening in the specimen, if it is susceptible. After impact, the specimen is aged for 24 hour. After aging, color readings are taken on the specimen at the impact area and outside the impact area, using a Hunter Color Quest XE calorimeter. The colorimeter is set up for Hunter lab readings using illuminant D65/10°. D65 or $D_{65}$ is the most commonly used daylight illuminant, representing noon daylight. 10 refers to the angular coverage (i.e. 10°) by the illuminant. A reading is taken with the disk's impact area centered over the reflectance port. A reading is also taken outside the impact area. The degree of stress-whitening is judged as the difference between the "L" readings of the two measurements. Hunter "L" is a measure of the black-white color spectrum (L=100 white, L=0 black). If a sample displays stress-whitening, the "L" value on the impact area will be higher (whiter) than the "L" value on the non-impact area and a positive ΔL ("L" on impact area–"L" on non-impact area) will be obtained. The values for ΔL provide a means for comparing the relative susceptibility to stress-whitening among a set of samples. Three specimens per sample are generally tested and the "L" values averaged.

In certain embodiments, the blends of the present invention may also comprise a third polymer component. The third polymer component may be added to the semi-crystalline polymer, the semi-amorphous polymer or the blend by methods well known in the art. In these embodiments, the third polymer component (TPC) comprises low density polyethylene (density 0.915 to less than 0.935 g/cm$^3$), linear low density polyethylene, ultra low density polyethylene (density 0.85 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), or combinations thereof. For example, polyethylene produced using a metallocene catalyst system (mPEs), i.e., ethylene homopolymers or copolymers may be employed. In a particular example, mPE homopolymers and copolymer are those produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Illustrative but not exclusive commercially available products are available from ExxonMobil Chemical Company, Houston, Tex., under the tradenames EXCEED™ and EXAC™ among others well known in the industry. In another embodiment, the third component is a propylene polymer or copolymer, an EP/EPDM copolymer rubber, EVA, or other type of polyolefin.

The blends of this invention may also comprise additives and other ingredients. For example the blends of this invention may comprise slip agents, preferably present at 50 ppm to 10 weight %, preferably 50 to 5000 ppm. Preferably the slip additives are present at 0.001 to 1 wt % (10 to 10,000 ppm), more preferably 0.01 to 0.5 wt % (100 to 5000 ppm), more preferably 0.1 to 0.3 wt % (1000 to 3000 ppm), based upon the weight of the composition. Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethy-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; and mixtures thereof. Preferred slip additives are unsaturated fatty acid amides, which are available from Crompton (Kekamide™ grades) and Croda Universal (Crodamide™ grades). Particularly preferred are the erucamide and oleamide versions of unsaturated fatty acid amides. Preferred slip agents include amides having the chemical structure $CH_3(CH_2)_7 CH=CH(CH_2)_xCONH_2$ where x is 5 to 15. Particularly preferred amides include: 1) Erucamide $CH_3(CH_2)_7 CH=CH (CH_2)_{11}CONH_2$ which may also be referred to as cis-13-docosenoamide (Erucamide is commercially available from Akzo Nobel Amides Co. Ltd. under the trade name ARMOSLIP E); 2) Oleylamide $CH_3(CH_2)_7CH=CH(CH_2)_8 CONH_2$; and 3) Oleamide which may also be preferred to as N-9-octadecenyl-hexadecanamide) $CH_3(CH_2)_7CH=CH (CH_2)_7CONH_2$. In another embodiment, stearamide is also useful in this invention. Other preferred slip additives include those described in WO 2004/005601A1.

The blends of this invention may also comprise clarifying agent. Preferably the clarifying agent is present at from 10 ppm to 10 weight %, more preferably 25 ppm to 5 weight %, preferably 50 ppm to 4000 ppm, based on total polymer in the blend composition. Preferred clarifying agents include organophosphates, phosphate esters, sodium benzoate, talc, sorbitol, adipic acid, benzoic acid, (or metal salts of these acids), inorganic fillers, and the like. Preferred clarifying agents preferably comprise 50 to 4000 ppm of sorbitol-based agents, aluminum salt based agents, sodium salt based agents. Preferred clarifying agents include nucleating agents such as: Hyperform (e.g. HPN-68) and Millad additives (e.g. Millad 3988-3,4-dimethylbenzylidene sorbitol, dibenzylidene sorbitol) from Milliken Chemicals, Spartanburg, S.C., organophosphates like NA-11 and NA-21 from Amfine Chemicals, Allendale, N.J. Also, other nucleating agents may also be employed such as Ziegler-Natta olefin product or other highly crystalline polymers. Particularly preferred clarifying agents include disodium[2.2.1]heptane bicyclodicarboxylate, bis (3,4 dimethylbenzylidene)sorbitol, sodium 2,2'-methylene-bis(4,6-di-tert-butylphenyl) phosphate, (p-chloro, p'methyl) dibenzylidene sorbitol, bis(p-ethylbenzylidene)sorbitol, 1,2,3,4-dibenzylidene sorbitol, 1,2,3,4-di-para-methylbenzylidene sorbitol, and or aluminum 2,2'-methylene-bis(4,6-di-tert-butylphenyl)phosphate.

Further, a variety of additives may be incorporated into the embodiments described above used to make the blends and films for various purposes. Such additives include, for example, stabilizers, antioxidants, fillers, colorants, and antiblock agents. Primary and secondary antioxidants include, for example, hindered phenols, hindered amines, and phosphites. Nucleating agents include, for example, sodium benzoate and talc. Also, other nucleating agents may also be employed such as Ziegler-Natta olefin product or other highly crystalline polymer. Antiblock agents include amorphous silicas, talc, zin stearate among others. a Additives such as dispersing agents, for example, Acrowax C, can also be included. Catalyst deactivators are also commonly used, for example, calcium stearate, hydrotalcite, and calcium oxide, and/or other acid neutralizers known in the art.

Other additives include, for example, fire/flame retardants, plasticizers, vulcanizing or curative agents, vulcanizing or curative accelerators, cure retarders, processing aids, tackifying resins, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include lubricants and UV stabilizers. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired.

Process oils can also be optimally added to the embodiments described above. The blend may include process oil in the range of from 1 to 50, alternatively in the range of from 2 to 20 parts by weight of process oil per hundred parts of total polymer components. The addition of process oil in moderate amounts lowers the viscosity and stiffness of the blend while improving the properties of the blend at temperatures near and below 0° C. It is believed that these benefits arise by the lowering of the Tg of the blend. Additional benefits of adding process oil to the blend include improved processibilty and a better balance of elastic and tensile strength. The process oils typically consist of (a) hydrocarbons consisting essentially of carbon and hydrogen with traces of hetero atoms such as oxygen or (b) essentially of carbon, hydrogen and at least one hetero atom such as dioctyl phthalate, ethers and polyethers. Preferred process oils have a high boiling point to be substantially involatile at 200° C. Such process oils are commonly available either as neat solids or liquids or as physically absorbed mixtures of these materials on an inert support (e.g. clays, silica) to form a free flowing powder. Other useful process oils include a mixture of a large number of chemical compounds which may consist of linear, acyclic but branched, cyclic and aromatic carbonaceous structures. Another family of useful process oils are certain low to medium molecular weight (Molecular weight ($M_n$)<10,000) organic esters and alkyl ether esters. Examples of process oils are Sunpar™ 150 and 220 from The Sun Manufacturing Company of Marcus Hook, Pa., USA and Hyprene™ V750 and Hyprene™ V1200 from Ergon, in Jackson, Miss. and IRM 903 from Calumet Lubricants Company in Princeton, La. It is also anticipated that combinations of process oils each of which is described above may be used in the practice of the invention. In certain embodiments, it is important that in the selection the process oil be compatible or miscible with the blend composition in the melt to form a homogenous one phase blend, although two phase blends and multi-phase blends are also contemplated. The addition of the process oils to the blend or blend polymer components maybe made by any of the conventional means known to the art.

The addition of certain process oils to lower the glass transition temperature of the blends of isotactic polypropylene and ethylene propylene diene rubber has been described in the art by Ellul in U.S. Pat. Nos. 5,290,886 and 5,397,832. These procedures are easily applicable to the current invention.

In certain embodiments the components as well as the blends may include various amounts of plasticizer(s). In one embodiment, the plasticizer comprises $C_6$ to $C_{200}$ paraffins, and $C_8$ to $C_{100}$ paraffins in another embodiment. In another embodiment, the plasticizer consists essentially of $C_6$ to $C_{200}$ paraffins, and consists essentially of $C_8$ to $C_{100}$ paraffins in another embodiment. For purposes of the present invention and description herein, the term "paraffin" includes all isomers such as n-paraffins, branched paraffins, isoparaffins, and may include cyclic aliphatic species, and blends thereof, and may be derived synthetically by means known in the art, or from refined crude oil. Suitable plasticizers also include "isoparaffins", "polyalphaolefins" (PAOs) and "polybutenes" (a subgroup of PAOs). These three classes of compounds can be described as paraffins which can include branched, cyclic, and normal structures, and blends thereof. They can be described as comprising $C_6$ to $C_{200}$ paraffins in one embodiment, and $C_8$ to $C_{100}$ paraffins in another embodiment. Preferred plasticizers include those described in WO 2004/014998 (which is incorporated by reference herein), particularly those plasticizers described at page 9, line 31 to page 26, line 19. Preferred poly-alpha-olefins (PAO's) useful in this invention include those described in WO 2004/014998, particularly those described at page 17, line 19 to page 19, line 25. Likewise Group III Basestocks may be used as plasticizers herein. Preferred Group III Basestocks include those described in WO 2004/014998, particularly those Group III Basestocks which are severely hydrotreated mineral oils having a saturates levels of 90% or more, preferably 92% or more, preferably 94% or more, preferably 95% or more, and sulfur contents less than 0.03%, preferably between 0.001 and 0.01%, and viscosity index (VI) is in excess of 120, preferably 130 or more. Preferably the Group III hydrocarbon base stock has a kinematic viscosity at 100° C. of 3 to 100, preferably 4 to 100 cSt, preferably 6 to 50 cSt, preferably 8 to 20; and/or a number average molecular weight of 300 to 5,000, preferably 400 to 2,000, more preferably 500 to 1,000; and/or a carbon number of 20 to 400, preferably 25 to 400, preferably 35 to 150, more preferably 40 to 100. The plasticizer may be present in the blends of the invention from 0.1 wt % to 60 wt % in one embodiment (based upon the weight of the blend, respectively), and from 0.5 wt % to 40 wt % in another embodiment, and from 1 wt % to 20 wt % in yet another embodiment, and from 2 wt % to 10 wt % in yet another embodiment, wherein a desirable range may comprise any upper wt % limit with any lower wt % limit described herein.

Films

In one embodiment the blends of the present invention are formed into films. Polyolefin films are widely used; for example, in shopping bags, pressure sensitive tape, gift wrap, labels, food packaging, non-food packaging, medical applications, etc. Most of these applications require high tear (in machine and transverse directions) and impact strengths, puncture resistance, high gloss, and low haziness. The blends described above may be formed into monolayer or multilayer films appropriate for such applications. These films may be formed by any of the conventional techniques known in the art including extrusion, co-extrusion, extrusion coating, lamination, blowing and casting. The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In another embodiment the layer comprising the blends described herein may be combined with one or more other layers. The other layer(s) may be any layer typically included in multilayer film structures. For example the other layer or layers may be:

1. Polyolefins

Preferred polyolefins include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar Polymers

Preferred polar polymers include homopolymers and copolymers of esters, amides, acetates, anhydrides, copolymers of a $C_2$ to $C_{20}$ olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic polymers Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexene, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous

Other preferred layers can be paper, wood, cardboard, metal, metal foils (such as aluminum foil and tin foil), metallized surfaces, glass (including silicon oxide (SiO.x) coatings applied by evaporating silicon oxide onto a film surface), fabric, spunbonded fibers and fabrics, and non-wovens (particularly polypropylene spun bonded fibers and fabrics or non-wovens), and substrates coated with inks, dyes, pigments, and the like.

The films may vary in thickness depending on the intended application, however films of a thickness from 1 to 250 µm are usually suitable. Films intended for packaging are usually from 10 to 250 µm thick. The thickness of the sealing layer is typically 0.2 to 50 µm. There may be a sealing layer on both the inner and outer surfaces of the film or the sealing layer may be present on only the inner or the outer surface.

Additives such as slip, antiblock, antioxidants, pigments, fillers, processing aids, UV stabilizers, neutralizers, lubricants, surfactants and/or nucleating agents may also be present in one or more than one layer in the films. Examples of useful additives include silicon dioxide, titanium dioxide, polydimethylsiloxane, talc, dyes, wax, calcium stearate, carbon black, low molecular weight resins and glass beads.

In another embodiment one or more layers may be modified by corona treatment, electron beam irradiation, gamma irradiation, microwave irradiation, or metallizing. In a preferred embodiment one or both of the surface layers is modified by corona treatment.

The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. The films comprising a hydrocarbon resin may be oriented in uniaxial or biaxial directions to the same or different degrees.

In a preferred embodiment, this invention relates to a film comprising a layer comprising one or more of the blends above (where the layer is 2.5 to 635 µm/0.1 to 25 mils thick) where the film has:

a haze of 10% or less, a 1° Secant Tensile Modulus of 100,000 to 30,000 psi (690 to 207 MPa), an Elmendorf tear in both the machine direction and transverse direction of 45 g/mil or more (1.77 g/micron or more), a total energy impact of 4 J or more, and a melt flow rate of 0.1 to 100 dg/min.

In a preferred embodiment, the films and or the layers comprising the blends described herein are from 2.5 to 635 microns (µm) thick, preferably between 5 to 550 µm thick, preferably 10 to 500 µm thick, preferably between 25 to 400 µm thick, preferably 20 to 200 µm thick.

The films of the present invention preferably have a haze of 10% or less, preferably 5% or less, preferably 3% or less, preferably 2% or less, preferably 1% or less, preferably 0.5% or less, as measured by ASTM D 1003.

In another embodiment, the films of the present invention preferably have a 45° gloss (MD and TD) of 70 or more, preferably 75 or more, preferably 80 or more, preferably 82 or more, preferably 85 or more, preferably 90 or more, as measured by ASTM D 2457 at an angle of 45°, unless otherwise stated.

In another embodiment, the films of the present invention have low modulus (high degree of softness); preferably have 1° Secant tensile Modulus (as measured by ASTM D 882) of 125,000 psi to 100,000 psi (690 to 860 MPa), preferably 125,000 psi to 50,000 psi, (345 to 860 MPa), preferably 125,000 to 30,000 psi (205 to 860 MPa).

In another embodiment, the films of the present invention preferably have an Elmendorf tear in the machine direction (MD) of 45 g/mil or more (1.77 g/micron or more), preferably 45 g/mil to 75 g/mil (1.77 to 2.95 g/µm), preferably 45 g/mil to 100 g/mil (1.77 to 3.94 g/µm), preferably 45 g/mil to 120 g/mil (1.77 to 4.72 g/µm), as determined by ASTM D1922, and normalized by the average film thickness in mil (0.001 in or 25.4/µm).

In another embodiment, the films of the present invention preferably have a total energy impact (ASTM D 4272-99) of 3 ft.lb or more (4 J or more), preferably 2 to 6 ft.lb or more (2.7 to 8.1 J).

In another embodiment, the films of the present invention preferably have a Ultimate Tensile Strength, and (as determined by ASTM D882.) of 6000 psi or more (41.4 MPa) along both MD and TD.

In another embodiment, the films of the present invention preferably have a Elongation at Break) (as determined by ASTM D882.) of 600% or more along both MD and TD.

In another embodiment, the films of the present invention preferably have a Puncture Energy of 25 in.lb/mil (0.11 J/µm) or more as measured according to ASTM D5748-95 except that i) a 0.75 inch diameter elongated stainless steel probe with matted finish, instead of a 0.75 inch diameter pear shaped TFE-fluorocarbon coated probe was used, and ii) an average gauge value was used for all the test specimens, instead of separate gauge measurements on each test specimen.

In another embodiment, the films of the present invention preferably have a Puncture resistance of 8 lb/mil (1.4 N/µm) or more as measured according to ASTM D 5748-95, except for the measurement modifications noted in the previous paragraph.

The blends of this invention can be used in application areas requiring soft films, such as those used in diapers. The good tear propagation resistance and total energy impact resistance, coupled with the low haze, offer broad opportunities in packaging films.

In additional embodiments, this invention relates to:

1. A film comprising a heterogeneous blend of:
   1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less; and
   2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:
   a) heat of fusion of 4 to 70 J/g;
   b) a melt flow rate of 0.1 to 200 dg/min;
   c) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
   d) an Mw/Mn of 1.5 to 4,
   e) a propylene triad tacticity, as measured by $^{13}$C NMR, of 75% or greater;

where the blend has:
   i) a melt flow rate of 0.5 to 100 dg/min; and
   ii) 0 to 5 weight % filler, based upon the weight of the polymers and the filler; and
   iii) a haze of 20% or less measured on a 1 mm thick injection molded chip; and
   iv) a permanent set of greater than 65%; and where the film is 0.1 to 25 mil (2.5 to 635 micron) thick and has:
   a haze of 10% or less,
   a 1° Secant tensile modulus of 100,000 to 30,000 psi,
   an Elmendorf tear in the machine direction of 45 g/mil or more,
   an Elmendorf tear in the transverse direction of 45 g/mil or more,
   a total energy impact of 3 J or more; and
   a 45 degree gloss of 82 or more.

2. The film of paragraph 1 wherein the semi-crystalline polymer comprises propylene and from 1 to 3 weight % of a C2 to C10 alpha olefin comonomer.

3. The film of paragraph 2 wherein the alpha-olefin comonomer is selected from the group consisting of ethylene, butene, pentene, hexene, heptene, octene, nonene, and decene.

4. The film of paragraph 2 wherein the alpha-olefin comonomer is selected from the group consisting of ethylene, butene, hexene, and octene.

5. The film of paragraph 2 wherein the alpha-olefin comonomer is ethylene.

6. The film of paragraph 1 wherein the semi-crystalline polymer comprises 0 weight % comonomer.

7. The film of any of the above paragraphs wherein the semi-crystalline polymer has a melting point of 120 to 170° C.

8. The film of any of the above paragraphs wherein the semi-crystalline polymer has an Mw/Mn between 1.5 and 4.

9. The film of any of the above paragraphs wherein the semi-amorphous polymer comprises propylene and from 10 to 20 weight % of a C2 to C10 alpha olefin comonomer.

10. The film of paragraph 9 wherein the alpha-olefin comonomer is selected from the group consisting of ethylene, butene, pentene, hexene, heptene, octene, nonene, and decene.

11. The film of paragraph 9 wherein the alpha-olefin comonomer is selected from the group consisting of ethylene, butene, hexene, and octene.

12. The film of paragraph 9 wherein the alpha-olefin comonomer is ethylene.

13. The film of any of the above paragraphs wherein the semi-amorphous polymer has a percent crystallinity of between 2 and 25%.

14. The film of any of the above paragraphs wherein the semi-amorphous polymer has a melt flow rate of 1 to 25 dg/min.

15. The film of any of the above paragraphs wherein the semi-amorphous polymer has a melting point between 30 and 80° C.

16. The film of any of the above paragraphs wherein the semi-amorphous polymer has a tacticity index of from 4 to 12.

17. The film of any of the above paragraphs wherein the semi-amorphous polymer has a propylene triad tacticity of 80% or greater, preferably 85% or greater, preferably 90% or greater.

18. The film of any of the above paragraphs where the blend has a haze of 15% or less, preferably 12% or less, preferably 10% or less.

19. The film of any of the above paragraphs where the film has a gloss of 85 units or more, preferably 89 or more, preferably 90 or more.

20. The film of any of the above paragraphs wherein the semi-amorphous polymer comprises from 11 to 25 weight % comonomer and is present at from 15 to 40 weight %, and wherein the blend has dispersions of semi-amorphous polymer less than 4 μm in size in a continuous phase of semi-crystalline polymer and wherein the film has machine direction Elmendorf tear of 60 g/mil (2.4 g/μm) or more, haze of 2% or less, 45 degree gloss of 87 unit or higher, 1% secant tensile modulus of 75,000 psi (517 MPa) or lower, and total energy impact of 3 J or more.

21. The film of any of paragraphs 1 to 19 wherein the semi-amorphous polymer comprises from 11 to 25 weight % comonomer and is present at from 25 to 40 weight %, and wherein the blend has dispersions of semi-amorphous polymer less than 4 μm in size in a continuous phase of semi-crystalline polymer and wherein the film has machine direction Elmendorf tear of 100 g/mil (2.4 g/μm) or more, haze of 1.5% or less, 45 degree gloss of 88 unit or higher, 1% secant tensile modulus of 50,000 psi (517 MPa) or lower, and total energy impact of 7 J or more.

22. The film of any of the above paragraphs wherein the blend has a permanent set of 165% or more, preferably 175% or more, preferably 200% or more.

23. The film of any of the above paragraphs wherein a 3.18 mm thick injection molded pad of the blend has a resistance to stress whitening of Hunter color ΔL of 20 or less, preferably 15 or less, preferably 10 or less, preferably 5 or less.

24. The film of any of the above paragraphs wherein the film has a haze of 4% or less, preferably 3% or less, preferably 2% or less.

25. The film of paragraph 23 wherein the film has a haze of 5% or less, an MD Elmendorf tear of 50 g/mil or more and a total energy impact of 3 J or more.

26. The film of paragraph 23 wherein the film has a haze of 2% or less, an MD Elmendorf tear of 100 g/mil or more and a total energy impact of 7 J or more.

27. The film of any of the above paragraphs wherein the film has:

a) a haze of 2% or less;

b) a machine direction tensile strength at break of greater than 40 MPa;

c) a transverse direction tensile strength at break of greater than 40 MPa;

d) a machine direction elongation at break of greater than 500%;

e) a transverse direction elongation at break of greater than 500%;

f) a machine direction Elmendorf tear of 50 to 150 g/mil;

g) a transverse direction Elmendorf tear of 100 to 400 g/mil;

h) a puncture resistance of 6 to 10 lb/mil; and i) a machine direction tensile modulus of less than 350 MPa.

28. The film of any of the above paragraphs where the film is a cast film, a blown film, or a laminated film.

29. The film of any of the above paragraphs wherein the film is coextruded, or laminated.

30. The film of any of the above paragraphs wherein the film comprises two or more layers.

31. The film of any of the above paragraphs wherein the film comprises a core layer comprising the heterogeneous blend.

32. The film of any of the above paragraphs wherein the film comprises a skin layer comprising the heterogeneous blend.

33. The film of any of the above paragraphs wherein the blend of the semi-amorphous and semi-crystalline polymers further comprises plasticizer, preferably poly-alphaolefin, preferably polydecene.

34. The film any of the above paragraphs wherein the heterogeneous blend further comprises slip agent, preferably 50 to 5000 ppm of an amides having the chemical structure $CH_3(CH_2)_7CH=CH(CH_2)_xCONH_2$ where x is 5 to 15.

35. The film of any of the above paragraphs wherein the heterogeneous blend further comprises a clarifying agent, preferably the clarifying agent is present at 10 ppm to 10 weight % (more preferably 25 ppm to 5 weight %, preferably 50 ppm to 4000 ppm, based on total polymer in the blend composition) of an organophosphate, phosphate ester, sodium benzoate, talc, sorbitol, adipic acid, benzoic acid, (or metal salts of these acids), inorganic fillers, preferably the clarifying agent is a sorbitol-based agents, aluminum salt based agents, or sodium salt based agents, or a Ziegler-Natta olefin product or other highly crystalline polymers, preferably the clarifying agent is disodium[2.2.1]heptane bicyclodicarboxylate, bis(3,4 dimethylbenzylidene)sorbitol, sodium 2,2'-methylene-bis(4,6-di-tert-butylphenyl)phosphate, (p-chloro, p'methyl)dibenzylidene sorbitol, bis(p-ethylbenzylidene)sorbitol, 1,2,3,4-dibenzylidene sorbitol, 1,2,3,4-di-para-methylbenzylidene sorbitol, and or aluminum 2,2'-methylene-bis(4,6-di-tert-butylphenyl)phosphate.

36. The film of any of paragraphs 1 to 35 wherein the semi-amorphous polymer has an intermolecular composition distribution of 85% ore more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative) of the average weight % comonomer of the copolymer, preferably no greater than 10%.

37. The film of any of the above paragraphs wherein the blend has dispersions of semi-amorphous polymer less than 4 μm in size in a continuous phase of semi-crystalline polymer, preferably less than 3 µm in size, preferably less than 2 µm in size, preferably less than 1 µm in size.

38. The film of any of the above paragraphs wherein the film has a haze of 1% or less.

39. The film of any of the above paragraphs wherein the film is laminated to a substrate, preferably the substrate is a non-woven fabric, paper, a polyolefin, wood, cardboard, metals, metal foils, metallized surfaces, glass, and or glass coatings.

40. The film of any of the above paragraphs wherein the film is laminated to a substrate, where the substrate is coated with ink, dye, and or pigment.

41. A package comprising the film of any of the above paragraphs.

42. A diaper, medical film or packaging film comprising the film of any of paragraphs 1 to 40.

EXAMPLES

Mw, Mn, Mz were measured by Gel Permeation Chromatography, as described above.

Mooney Viscosity is measured according to ASTM D 1646.

Melt flow rate (MFR) was measured according to ASTM D 1238 condition L at 230° C. under a load of 2.16 kg.

Ethylene weight % was measured as follows. A thin homogeneous film was pressed at a temperature of about 150° C. or greater, then mounted on a Perkin Elmer PE 1760 infrared spectrophotometer. A full spectrum of the sample from 600 $cm^{-1}$ to 4000 $cm^{-1}$ was recorded and the monomer weight percent of ethylene was calculated according to the following equation: Ethylene wt %=82.585-111.987X+30.045 $X^2$, wherein X is the ratio of the peak height at 1155 $cm^{-1}$ and peak height at either 722 $cm^{-1}$ or 732 $cm^{-1}$, whichever is higher.

Glass Transition Temperature (Tg), β relaxation, Loss Modulus (E") and Storage Modulus (E') were measured by dynamic mechanical thermal analysis (DMTA). The instrument used was the RSA II, Rheometrics Solid Analyzer II from TA Instruments, New Castle, Del. The instrument was operated in tension mode and used molded rectangular samples. Sample conditions were: 0.1% strain, 1 Hz frequency, and 2 degree C. per minute heating rate, covering the temperature range from −135 C to the melting point of the sample. Samples were molded at about 200 C. Typical sample dimensions were 23 mm length×6.4 mm width x thickness between 0.25 mm and 0.7 mm, depending on the sample. tan δ is the ratio of E"/E', where E' is the Storage Modulus and E" is the Loss Modulus. The output of these DMTA experiments is the storage modulus (E') and loss modulus (E"). The storage modulus measures the elastic response or the ability of the material to store energy, and the loss modulus measures the viscous response or the ability of the material to dissipate energy. The ratio of E"/E' (=tan [δ]) gives a measure of the damping ability of the material. Energy dissipation mechanisms (i.e., relaxation modes) show up as peaks in tan [δ], and are associated with a drop in E' as a function of temperature. The uncertainty associated with reported values of E' is expected to be on the order of ±10%, due to variability introduced by the molding process.

Crystallization temperature (Tc), melting temperature ($T_m$) and heat of fusion (Hf, ΔH, or $ΔH_f$) were measured using Differential Scanning Calorimetry (DSC). This analysis was conducted using either a TA Instruments MDSC 2920 or a Perkin Elmer DSC7. Typically, 6 to 10 mg of molded polymer or plasticized polymer was sealed in an aluminum pan and loaded into the instrument at room temperature. Melting data (first heat) were acquired by heating the sample to at least 30° C. above its melting temperature at a heating rate of 10° C./min. This provides information on the melting behavior under as-molded conditions, which can be influenced by thermal history as well as any molded-in orientation or stresses. The sample was then held for 10 minutes at this temperature to destroy its thermal history. Crystallization data was acquired by cooling the sample from the melt to at least 50° C. below the crystallization temperature at a cooling rate of 10° C./min. Typically, the blend samples were cooled down to −25 C. The sample was then held at this temperature for 10 minutes, and finally heated at 10° C./min to acquire additional melting data (second heat). The melting temperatures reported in the tables are the peak melting temperatures from the second heat unless otherwise indicated. For polymers displaying multiple peaks, the higher melting peak temperature is reported. Areas under the curve were used to determine the heat of fusion ($ΔH_f$) which can be used to calculate the degree of crystallinity. A value of 189 J/g was used as the equilibrium heat of fusion for 100% crystalline polypropylene. The percent crystallinity of a propylene polymer is calculated using the formula, [area under the curve (J/g)/189 (J/g)]*100.

Haze of the blend was measured according to ASTM D 1003 including that 2500 ppm of bis(3,4 dimethylbenzylidene)sorbitol (Millad 3988) was added to the blend prior to forming the blend into the molded 1 mm chip. Haze of the film was measured according to ASTM D 1003.

Gloss was measured according to ASTM D 2457 at a 45° angle.

Example 1

Copolymerization to Form the Semi-Amorphous Propylene-Ethylene Copolymers (SAPEC)

Continuous polymerization was conducted in a 9 liter continuous flow stirred tank reactor using hexane as the solvent. The liquid full reactor had a residence time of 9 minutes and the pressure was maintained at 700 kPa. A mixed feed of hexane, ethylene and propylene was pre-chilled to approximately −30° C. to remove the heat of polymerization, before entering the reactor. A solution of catalyst/activator in toluene and the scavenger in hexane were separately and continuously admitted into the reactor to initiate the polymerization. The reactor temperature was maintained between 35 and 50° C., depending on the target molecular weight. The feed temperature was varied, depending on the polymerization rate to maintain a constant reactor temperature. The polymerization rate was varied from 0.5 kg/hr to 4 kg/hr. Hexane at 30 kg/hr was mixed with ethylene at 717 g/hr and propylene at 5.14 kg/hr and fed to the reactor. The polymerization catalyst, dimethyl silyl bis-indenyl hafnium dimethyl activated in a 1:1 molar ratio with N',N'-dimethyl anilinium-tetrakis (pentafluorophenyl)borate was introduced at the rate of 0.0135 g/hr. A dilute solution of triisobutyl aluminum was introduced into the reactor as a scavenger of catalyst terminators at a rate of approximately 111 mole of scavenger per mole of catalyst. After five residence times of steady polymerization, a representative sample of the polymer produced in this polymerization was collected. The solution of the polymer was withdrawn from the top and then steam distilled to isolate the polymer. The polymerization rate was measured at 3.7 kg/hr. The polymer produced in this polymerization had an ethylene content of 14%, Mooney viscosity ML (1+4) at 125° C. of 13.1 and had isotactic propylene sequences. Variations in the composition of the polymer were obtained principally by changing the ratio of ethylene to propylene. Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

In the manner described in Example 1 above, several semi-amorphous propylene-ethylene copolymers (SAPEC) were synthesized. These are described in Table 1. Samples SAPEC-1 and 2 were utilized to prepare the blends to fabricate films.

TABLE 1

Characterization of Semi-Amorphous Propylene-Ethylene Copolymers

| SAPEC | ML(1 + 4) at 125 C | Mw[#] | Mn[#] | Mz[#] | Ethylene Wt %[*] | Tm dsc ° C. | ΔH melt J/g |
|---|---|---|---|---|---|---|---|
| SAPEC-1 | 2.5[**] | 227111 | 130615 | 349440 | 14.9 | 50.9 | 14.6 |
| SAPEC-2 | 2.2[**] | 247620 | 139049 | 388319 | 16.2 | 51.5 | 9.8 |
| SAPEC-3 | 14 | 248900 | 102000 | | 7.3 | 84.7 | |
| SAPEC-4 | 23.9 | 265900 | 124700 | | 11.6 | 43.0 | |
| SAPEC-5 | 33.1 | 318900 | 121900 | | 16.4 | 42.2 | |
| SAPEC-6 | 34.5 | | | | 11.1 | 63.4 | |
| SAPEC-7 | 38.4 | | | | 14.7 | 47.8 | |

[**]MFR values (dg/min) by ASTM D-1238 Cond L
[#]GPC data in daltons
[*]Ethylene wt % measured by IR procedure described earlier.

The semi-amorphous propylene-ethylene copolymers, which are derived from chiral metallocene-based catalysts, have a narrow inter and intramolecular composition distribution. The intermolecular composition distribution of the polymer was determined by thermal fractionation in hexane as follows: about 30 g of the crystallizable propylene-ethylene copolymer was cut into small cubes about ⅛th inch (0.32 cm) on the side and then introduced into a thick-walled glass bottle closed with screw cap along with 50 mg of Irganox 1076 antioxidant (Ciba-Geigy Corpn). 425 ml of hexane (a principal mixture of normal and iso-isomers) was added to the contents of the bottle and the sealed bottle was maintained at 23° C. for 24 hours. At the end of this period, the solution was decanted and the residue was treated with additional hexane for an additional 24 hours. At the end of this period, the two hexane solutions were combined and evaporated to yield a residue of the polymer soluble at 23° C. To the residue was added sufficient hexane to bring the volume to 425 ml and the bottle was maintained at 31° C. for 24 hours in a covered circulating water bath. The soluble polymer was decanted and an additional amount of hexane is added for another 24 hours at 31° C., prior to decanting. In this manner, fractions of the semi-amorphous propylene-ethylene copolymer soluble at 40° C., 48° C., 55° C. and 62° C. were obtained, at temperature increases of approximately 8° C. between stages. The soluble polymers were dried, weighed and analyzed for composition, as wt % ethylene content, by the IR technique described above. Soluble fractions obtained in the adjacent temperature increases are the adjacent fractions in the specification above. Data on different representative semi-amorphous propylene-ethylene copolymers are shown in Tables 2 and 3. EPR in Table 2 is an ethylene propylene rubber that does not contain crystallizable propylene species like the semi-amorphous copolymers. This EPR has 47% ethylene, a Mooney viscosity (ML 1+8 at 127 C) of 28 and a GPC polydispersity (Mw/Mn) of 2.3. It was obtained under the tradename Vistalon™ 457—by ExxonMobil Chemical in Houston, Tex.

TABLE 2

Solubility of Fractions of SAPEC's

| SAPEC | Fraction 1- Wt % soluble at 23° C. | Fraction 2- Wt % soluble at 31° C. | Fraction 3- Wt % soluble at 40° C. | Fraction 4- Wt % soluble at 48° C. |
|---|---|---|---|---|
| SAPEC-3 | 1.0 | 2.9 | 28.3 | 68.5 |
| SAPEC-4 | 6.5 | 95.7 | — | — |

TABLE 2-continued

Solubility of Fractions of SAPEC's

| SAPEC | Fraction 1- Wt % soluble at 23° C. | Fraction 2- Wt % soluble at 31° C. | Fraction 3- Wt % soluble at 40° C. | Fraction 4- Wt % soluble at 48° C. |
|---|---|---|---|---|
| SAPEC-5 | 51.6 | 52.3 | — | — |
| SAPEC-6 | 18.7 | 83.6 | — | — |
| SAPEC-7 | 36.5 | 64.2 | — | — |
| EPR | 101.7 | — | — | — |

Note:
The sum of the fractions may in some cases add up to slightly greater than 100, due to imperfect drying of the polymer fractions.

TABLE 3

Composition of Fractions of SAPEC's obtained in Table 2

| SAPEC | Wt % ethylene in Fraction 1 | Wt % ethylene in Fraction 2 | Wt % ethylene in Fraction 3 | Wt % ethylene in Fraction 4 |
|---|---|---|---|---|
| SAPEC-3 | | | 8.0 | 7.6 |
| SAPEC-4 | 12.0 | 11.2 | — | — |
| SAPEC-5 | 16.8 | 16.5 | — | — |
| SAPEC-6 | 13.2 | 11.2 | — | — |
| SAPEC-7 | 14.9 | 14.6 | — | — |
| EPR | 46.8 | | | |

Note:
Only fractions with more than 4% of the total mass of the polymer in Table 2 are analyzed for composition. The experimental accuracy in determination of the ethylene content is believed to be within about 0.4% absolute.

The above semi-amorphous propylene-ethylene copolymers SAPEC-1 and SAPEC-2 were combined with a metallocene-based propylene homopolymer to produce the blend compositions, as will be described later. SAPEC-1 and SAPEC-2 were first visbroken to reach an MFR of about 20 prior to melt blending with polypropylene. Visbreaking is a widely used and well-accepted procedure to increase the melt flow rate of propylene polymers. The procedure typically involves melt compounding the propylene polymer in the presence of a specific amount of a peroxide [e.g. (2,5 dimethyl-2,5-di(t-butyl peroxy)hexane) available as Luperox 101 from AtoFina, Organic Peroxides Divn., Philadelphia, Pa.]. The amount is dependent on the degree of MFR increase desired. The visbreaking was done in the presence of some polypropylene (60/40 blend of the SAPEC and a metallocene-based propylene homopolymer) to provide additional crystallinity. The presence of the polypropylene aids in the extrusion compounding step by providing rapid solidification of the extruded strands in the water bath, easier chopping of the strands into pellets and free movement of the pellets through transfer lines.

Example 2

Visbreaking of Semi-Amorphous Propylene-Ethylene Copolymers SAPEC-1 and -SAPEC-2

The polymer used along with the semi-amorphous propylene-ethylene copolymers during visbreaking was a propylene homopolymer, having an MFR of 7.5 dg/min and an Mw of 195,000 produced using a metallocene catalyst, namely, rac di-methyl siladiyl bis-(2-methyl, 4-phenyl indenyl) zirconium dimethyl activated with a silica bound activator of N,N-di-ethyl aniline tris(perfluorophenyl)boron in a pilot scale, two reactor, continuous, stirred tank, bulk liquid-phase process. In the catalyst, the zirconium loading was about 0.117 wt % and the boron loading about 0.12 wt %. The reactors were equipped with jackets for removing the heat of polymerization. The reactor temperature was set at 74° C. (165 F) in the lead reactor and 68° C. (155 F) in the tail reactor. Catalyst was fed at a rate of 1.2 g/hr. Tri-ethyl aluminum (TEAL; fed to the reactor as a 1 wt % solution in hexane solvent) was used as scavenger at a level of 20 ppm. The catalyst and silica bound activator, described above, were fed as a 10% slurry in mineral oil and were flushed into the reactor with propylene. Propylene monomer was fed into the lead reactor at a rate of 79.5 kg/hr (175 lb/hr) and to the tail reactor at a rate of 30 kg/hr (65 lb/hr). Hydrogen was added for molecular weight control at 1970 mppm in the lead reactor and 2220 mppm in the tail reactor. Polymer production rates were 20.5 kg/hr (45 lb/hr) in the lead reactor and 10 kg/hr (22 lb/hr) in the tail reactor. The reactor product was routed through a granules-handling system to separate and recover the final polymer product. The polymer discharged from the reactors had an MFR of 7.5 dg/min (GPC Mw 195,000, Mw/Mn 2.0, Mz/Mw 1.54). 68% of the final polymer product was derived from the first stage and 32% of the final product was derived from the second stage. The polymer was melt homogenized with 1500 ppm of Irganox-2215 (Ciba-Geigy Corporation) and pelletized. Visbreaking was conducted on blends of SAPEC-1 and SAPEC-2 with the 7.5 MFR propylene homopolymer discussed above. The blend ratio was 60 wt % SAPEC and 40 wt % propylene homopolymer. The visbreaking was carried out on a Reifenhauser extruder equipped with a single screw (60 mm screw diameter; 24:1 L/D ratio; mixing screw). A summary of the visbreaking experiments is shown in Table 4.

TABLE 4

Visbreaking of Blends of SAPEC-1 and SAPEC-2 with Propylene Homopolymer (60 wt %/40 wt %)

| Example | Copolymer | Peroxide (ppm) | Post treatment MFR dg/min |
|---|---|---|---|
| Example 2-1 | SAPEC-1 | 800 | 20.0 |
| Example 2-2 | SAPEC-2 | 950 | 30.0 |

Both products, Examples 2-1 and 2-2, contained 60 wt % of semi-amorphous propylene-ethylene copolymer. Examples 2-1 and 2-2 were then used to prepare additional blends containing different amounts of semi-amorphous propylene-ethylene copolymer.

Example 3

Preparation of Blends of Semi-Amorphous Propylene-Ethylene Copolymer and Propylene Homopolymer Example 2-1 and Example 2-2 were melt mixed with a metallocene-based propylene homopolymer having an MFR of 24 dg/min (ASTM 1238 2.16 kg, 230° C.), a density of 0.9 g/cc (ASTM D 792), and an Mw/Mn of 2 available from ExxonMobil Chemical Company in Houston, Tex. under the tradename ACHIEVE™ 3854 to produce several blends, shown in Table 5.

TABLE 5

Description of Final Blends of Ex 2-1 and Ex 2-2 and Achieve 3854

| | Ex-2-1 wt % | Ex-2-2 wt % | Achieve 3854 wt % | MFR dg/min of blend | Wt % ethylene in blend |
|---|---|---|---|---|---|
| Example 3-1 | | 55.5 (33.3 wt % SAPEC2 and 22.2 wt % PP) | 44.5 | 23.6 | 5.4 |
| Example 3-2 | | 25 (15 wt % SAPEC-2 and 10 wt % PP) | 75 | 22.0 | 2.4 |
| Example 3-3 | 45.75 (27.5 wt % SAPEC 1 and 18.25 wt % PP) | | 54.25 | 21.2 | 4.1 |

Note:
PP refers to the 7.5 dg/min MFR metallocene homopolymer used during the visbreaking operation.

Polymer blend Examples 3-1 (33.3 wt % of semi-amorphous propylene-ethylene copolymer), 3-2 (15 wt % semi-amorphous propylene-ethylene copolymer) and 3-3 (27.5 wt % semi-amorphous propylene-ethylene copolymer) are all based on semi-amorphous propylene-ethylene copolymers that contain upwards of 14 wt %, ethylene (SAPEC-1 and SAPEC-2 in Table 1). This is higher than the ~12 wt % ethylene limit, beyond which the propylene-ethylene copolymers are believed to become immiscible in blends with polypropylene. This immiscibility leads to heterogeneous blends, with the semi-amorphous propylene-ethylene copolymers being finely dispersed in a matrix of polypropylene. A representation of this is shown in FIG. 1, which is a plot of tan δ (E"/E' from DMTA measurements) versus temperature for blend polymer similar to Example 3-3. The blend comprised 33.3 wt % of a semi-amorphous propylene-ethylene copolymer, containing 14.9 wt % ethylene, with 66.7 wt % of a semi-crystalline propylene homopolymer. The semi-amorphous propylene-ethylene copolymer is the same as used in Example 3-3 (viz. SAPEC-1). The figure shows the tan δ response in the region of the β relaxation (ie. Tg). Two distinct peaks are observed, corresponding to the respective Tgs of the polypropylene (at 0° C.) and the semi-amorphous propylene-ethylene copolymer (−25° C.). In blend polymer Examples 3-2 and 3-1, the SAPEC component (viz. SAPEC-2) contains an even higher level of ethylene than Example 3-3 (16.2 wt % ethylene versus 14.9 wt % ethylene). As a consequence, a similar 2 peak tan δ response is expected. This observation of two tan δ response peaks, corresponding to the respective Tg temperatures of the semi-amorphous and semi-crystalline polymers, is an indication of the heterogeneous nature of the inventive blends. Further demonstration of the heterogeneous nature of the inventive blends can be seen in the AFM micrograph shown in FIG. 2. The blend in this figure comprises 20 wt % of a semi-amorphous propylene-ethylene copolymer, containing 14.5 wt % ethylene, with 80 wt % of a semi-crystalline propylene homopolymer. The micrograph shows a finely dispersed semi-amorphous propylene-ethylene copolymer (dark phase) in a matrix of the semi-crystalline polymer (light phase).

Permanent set measurements, by the procedure described earlier, were conducted on a blend composition comprising 33.3 wt % of semi-amorphous propylene-ethylene copolymer and 66.7 wt % of semi-crystalline polymer. The semi-amorphous propylene-ethylene copolymer contained 14.5 wt % ethylene, comparable to SAPEC-1 (14.9 wt % ethylene). This blend had a mean permanent set (average for two specimens, each over two hysterisis cycles on an Instron machine) of 187.5%. A second measurement was conducted on a blend with 40 wt % of the above semi-amorphous propylene-ethylene copolymer and 60 wt % of semi-crystalline polymer. The mean permanent set for this blend was 166.5%. These high permanent set values confirm the non-elastic nature of the inventive blends.

Example 4

Copolymerization to Form Metallocene-Based Random Copolymer

The metallocene-based random copolymer used as a comparator—for the semi-amorphous propylene-ethylene copolymers blends, was a propylene copolymer, having an MFR of 6.4 dg/min and an Mw of 224,000 produced using a metallocene catalyst, namely, rac-di-methyl siladiyl bis-(2-methyl, 4-phenyl indenyl) zirconium dimethyl activated with a silica bound activator of N,N-di-ethyl aniline tris(perfluorophenyl)boron in a pilot scale, two reactor, continuous, stirred tank, bulk liquid-phase process. In the catalyst, the zirconium loading was about 0.117 wt % and the boron loading about 0.12 wt %. The reactors were equipped with jackets for removing the heat of polymerization. The reactor temperature was set at 64° C. (148 F) in the lead reactor and 59° C. (138 F) in the tail reactor. Catalyst was fed at a rate of 1.7 g/hr. Tri-ethyl aluminum (TEAL; fed to the reactor as a 1 wt % solution in hexane solvent) was used as scavenger at a level of 20 ppm. The catalyst and silica bound activator, described above, were fed as a 10% slurry in mineral oil and were flushed into the reactor with propylene. Propylene monomer was fed into the lead reactor at a rate of 79.5 kg/hr (175 lb/hr) and to the tail reactor at a rate of 30 kg/hr (65 lb/hr). Ethylene was fed to both reactors and the vapor phase concentration of ethylene in both reactors was about 10 mole %. Hydrogen was added for molecular weight control at 1129 mppm in the lead reactor and 1641 mppm in the tail reactor. Polymer production rates were 18.0 kg/hr (39.5 lb/hr) in the lead reactor and 6.4 kg/hr (14.1 lb/hr) in the tail reactor. The reactor product was routed through a granules-handling system to separate and recover the final polymer product. The polymer discharged from the reactors had an MFR of 6.4 dg/min (GPC Mw 224,000, Mw/Mn 2.0, Mz/Mw 1.68). The ethylene incorporation was measured as 3.3 wt % in the lead reactor product and 3.1 wt % in the tail reactor product. Ethylene measured in the final blended product was 3.2 wt %. 74% of the final polymer product was derived from the first stage and 26% of the final product was derived from the second stage. The polymer showed a DSC melting peak at 127.8° C. and a DSC crystallization peak at 91.23° C. The polymer was melt homogenized with 500 ppm of Irganox-2215 (Ciba-Geigy Corporation) and 300 ppm of DHT-4A neutralizer (Kyowa Chemical Industry Co., Ltd., Osaka, Japan) and vis-broken on an extruder, as previously described, to a final MFR of 24, from the starting MFR of 6.4. The final visbroken product at 24 MFR was used as a control during film fabrication and film testing and labeled as Example 4.

Example 5

Ziegler-Natta-Based Random Copolymers

Granules of random copolymer (from a standard commercial Ziegler-Natta catalyst; 2nd generation, unsupported catalyst) produced in a commercial reactor, were used as the starting material to prepare a Ziegler-Natta RCP control. The product contained 3.0 wt % ethylene as comonomer. These granules were melt homogenized with 500 ppm of Irganox-2215 (Ciba-Geigy Corporation) stabilizer and 300 ppm of DHT-4A neutralizer (Kyowa chemical Industry Co., Ltd., Osaka, Japan) and again visbroken on an extruder as outlined previously from an MFR ~1.0 to 24 MFR. This 24 MFR, 3.0 wt % ethylene copolymer, labeled as Example 5-1, served as one Ziegler-Natta control.

The other Ziegler-Natta random copolymer control was PD9282 E2, from ExxonMobil Chemical Company, Houston, Tex. This commercial product is made from a standard, supported Ziegler-Natta catalyst. It is a 5.0 MFR propylene copolymer and contains 5.0 wt % ethylene. It typically has a DSC melting point of 133° C. It contains an additive package of 1800 ppm Irganox-1010 stabilizer (Ciba-Geigy Corporation), 300 ppm DHT-4A neutralizer and 1000 ppm antiblock. PD9282 E2 was labeled as Example 5-2.

Example 6

Ziegler-Natta-Based Impact Copolymers

As an example of a conventional heterogeneous propylene copolymer composition, Ziegler-Natta impact copolymer PP7623 E7 was selected as control. This product has an MFR of 7.5 dg/min and total ethylene content of 9 wt %. It contains 600 ppm of Irganox 1010 stabilizer, 600 ppm Irgafos-168 stabilizer and 300 ppm of DHT-4A neutralizer. It is available from ExxonMobil Chemical Company, Houston, Tex. PP7623 E7 was labeled as Example 6-1.

A summary of the Example polymers used to form film is shown in Table 6. In addition to the three heterogeneous SAPEC—polypropylene blends, two Ziegler-Natta RCPs and one Ziegler-Natta ICP discussed above, metallocene homopolymer ACHIEVE 3854 (24 MFR; control) was also evaluated. ACHIEVE 3854 is a metallocene-based propylene homopolymer having an MFR of 24 dg/min (ASTM 1238 Condition L, 2.16 kg, 230° C.), a density of 0.9 g/cc (ASTM D 792), and an Mw/Mn of about 2, available from ExxonMobil Chemical Company in Houston, Tex.

TABLE 6

Summary of Polymers used to fabricate Films

| | Polymer type | MFR (dg/min) | Total Ethylene (wt %) |
|---|---|---|---|
| Example 3-1 | SAPEC/HPP blend | 23.6 | 5.4 |
| Example 3-2 | SAPEC/HPP blend | 22.0 | 2.4 |
| Example 3-3 | SAPEC/HPP blend | 21.2 | 4.1 |
| Example 4 | Metallocene RCP | 24.0 | 3.2 |
| Example 5-1 | Z-N RCP | 24.0 | 3.0 |
| Example 5-2 | Z-N RCP | 5.0 | 5.0 |
| Example 6-1 | Z-N ICP | 7.5 | 9.0 |
| ACHIEVE 3854 | Metallocene HPP | 24.0 | 0 |

Note:
HPP is propylene homopolymer

Example 7

Fabrication of Films

Cast monolayer films from most of the polymers in Table 6 were fabricated on a Killion cast coex film line. The line has three 24:1 L/D extruders ('A' extruder at 1 inch or 25.4 mm diameter; 'B' extruder at 0.75 inch or 19.05 mm diameter; 'C' extruder at 0.75 inch or 19.05 mm diameter) which feed polymer into a feedblock. For the monolayer films, only the 'A' extruder was used. The feedblock diverts molten polymer from each extruder to specific channels. The combined streams enter an 8 inch (203.2 mm) wide Cloeren die. Molten polymer exits the die and is cast onto a chill roll (8 inch or 203.2 mm diameter and 10 inch or 254 mm roll face). The film take-off unit is of adjustable speed, to obtain films of different desired thicknesses. Typical line operating conditions during the production of about 2 mil (50.8 μm) films are shown in Table 7.

TABLE 7

Typical Killion Cast Line Operating Conditions (2 mil or 50.8 μm films)

| | |
|---|---|
| Zone 1 Temperature | 390 F. (199 C.) |
| Zone 2 Temperature | 400 F. (204.5 C.) |
| Zone 3 Temperature | 410 F. (210 C.) |
| Adapter 1 Temperature | 420 F. (215.5 C.) |
| Adapter 2 Temperature | 420 F. (215.5 C.) |
| Die/Feedblock Temperature | 430 F. (221 C.) |
| Melt Temperature | 396-400 F. range (202-204.5 C.) |
| Pressure | 390-420 psi range (2.7 MPa-2.9 MPa) |
| Extruder Speed | 45-58 rpm range |
| Extruder Drive | 2-2.5 amp range |
| Line Speed | 10.8-11.6 fpm range (3.3-3.5 mpm) |
| Chill Roll Temperature | 58-64 F. range (14.5-17.8 C.) |
| Film thickness | 2.0-2.4 mil range (50.8-61.0 μm) |

Film from ICP product Example 6-1 was fabricated on a Black-Clawson cast film line. The line has two 3.5 inch (89 mm), 30/1 L/D extruders and one 2.5 inch (64 mm) 30/1 L/D extruder. The flows from each extruder are combined in a three-layer Cloeren feed block. In addition to monolayer film, various 3-layer film constructions are possible. The die (Extrusion Dies Inc., Chippewa Falls, Wis.) is 42 inch (106.7 cm) wide and utilizes a coat-hanger design and an adjustable die lip. Die gaps of 15 to 20 mil (381 to 508 μm) are typical. The casting section utilizes 30 or 36 inch (76 to 91 cm) diameter primary chill rolls. With line speeds up to 1500 fpm (457 mpm), film thicknesses from 0.4 mil (10 μm) to upwards of 10 mil (254 μm) are possible.

Example 8

Film Properties

Test methods for the different film properties are outlined below. Film properties are generally identified with reference to the film orientation (e.g. along the machine direction, MD; or along the cross or transverse direction, TD). If a film property is mentioned without identifying the related film direction, then i) directionality is not relevant (e.g. puncture resistance) or ii) the value is the average over the machine and transverse directions.

| Test | Test Method |
|---|---|
| MD Ultimate Tensile Strength, kpsi (MPa) | ASTM D 882 |
| TD Ultimate Tensile Strength, kpsi (MPa) | ASTM D 882 |
| MD Elongation at Break, % | ASTM D 882 |
| TD Elongation at Break, % | ASTM D 882 |
| MD Tensile Modulus, kpsi (MPa) | ASTM D 882 |
| TD Tensile Modulus, kpsi (MPa) | ASTM D 882 |
| MD Elmendorf tear, g/mil (g/μm) | ASTM D 1922, |
| TD Elmendorf tear, g/mil (g/μm) | ASTM D 1922, |
| Puncture Resistance, lb/mil (g/μm) | ASTM 5748-95* |
| Puncture Energy, in.lb/mil (J/μm) | ASTM 5748-95* |
| Total energy impact, ft.lb (J) | ASTM D 4272-99 |
| Haze, % | ASTM D 1003 |
| Gloss at 45 degree, unit | ASTM D 2457 |

*Puncture resistance and puncture energy testing followed ASTM D 5748-95, but with the following exceptions:
i.) A 0.75 inch diameter elongated stainless steel probe with matted finish was used, instead of a 0.75 inch diameter pear-shaped TFE-fluorocarbon coated probe.
ii) An average gauge value measured for the test sample was used as the gauge for all puncture measurements on that sample, instead of measuring the gauge of each sample specimen.

Optical properties of 2.0 mil (50.8 μm) cast monolayer films from the polymers and polymer blends in Table 6 are shown in Table 8. All the films display low haze, but the films of Examples 3-1 and 3-3 appear to have the best clarity, even though they are heterogeneous blend compositions without clarifying or nucleating agents. Likewise, the gloss of these SAPEC blend films appears very favorable. Film (about 2 mil or 50.8 µm) mechanical properties of these same polymers are shown in Table 9.

TABLE 8

Cast Film Optical Properties

|  | Single Polymer or Blend | Film thickness (mil/µm) | haze (%) | Gloss at 45° (unit) |
|---|---|---|---|---|
| Example 3-1 | Heterogeneous blend | 1.98/50.3 | 0.7 | 90.9 |
| Example 3-2 | Heterogeneous blend | 2.08/52.8 | 1.2 | 89.2 |
| Example 3-3 | Heterogeneous blend | 1.98/50.3 | 0.5 | 90.8 |
| Example 4 | Single polymer | 2.08/52.8 | 1.1 | 89.9 |
| Example 5-1 | Single polymer | 2.3/58.4 | 1.2 | 88.4 |
| ACHIEVE 3854 | Single polymer | 2.2/55.6 | 0.9 | 90.8 |

TABLE 9

Cast Film Mechanical Properties [monolayer 2 mil or 50.8 µm]

Part 1

|  | Ex 3-1 | Ex-3-2 | Ex 3-3 |
|---|---|---|---|
| MD Ult Tensile, kpsi (MPa) | 6.3(43.5) | 7.1(49) | 6.4(44.2) |
| TD Ult Tensile, kpsi (MPa) | 6.3(43.5) | 6.9(47.6) | 6.3(43.5) |
| MD Break Elong, % | 700 | 694 | 698 |
| TD Break Elong, % | 713 | 686 | 690 |
| MD Ten Mod, kpsi (MPa) | 40(276) | 77(531) | 45(311) |
| TD Ten Mod, kpsi (MPa) | 37(255) | 69(476) | 38(262) |
| MD Elmen tear, g/mil (g/µm) | 125(4.92) | 40(1.57) | 113(4.45) |
| TD Elmen tear, g/mil (g/µm) | 323(12.72) | 38(1.50) | 184(7.24) |
| Puncture Resist, lb/mil (g/µm) | 7.9(141.2) | 8.9(159.1) | 8.3(148.4) |
| Punct Energy, in.lb/mil (J/µm) | 28.5(0.13) | 27.6(0.12) | 26(0.12) |
| Total energy impact, ft.lb (J) | >5.7(>7.7) | 2.2(3.0) | >5.7(>7.7) |

Part 2

|  | Ex 4 | Ex 5-1 | Achieve 3854 |
|---|---|---|---|
| MD Ult Tensile, kpsi (MPa) | 6.3(43.5) | 6.0(41.4) | 7.7(53.1) |
| TD Ult Tensile, kpsi (MPa) | 6.0(41.4) | 5.9(40.7) | 7.2(49.7) |
| MD Break Elong, % | 675 | 668 | 698 |
| TD Break Elong, % | 656 | 672 | 686 |
| MD Ten Mod, kpsi (MPa) | 60(414) | 64(442) | 115(794) |
| TD Ten Mod, kpsi (MPa) | 58(400) | 61(421) | 106(731) |
| MD Elmen tear, g/mil (g/µm) | 33(1.3) | 29(1.14) | 35(1.38) |
| TD Elmen tear, g/mil (g/µm) | 36(1.42) | 37(1.46) | 36(1.42) |
| Puncture Resist, lb/mil (g/µm) | 8.2(146.6) | 8.7(155.5) | 8.7(155.5) |
| Punct Energy, in.lb/mil (J/µm) | 24.2(0.11) | 26.6(0.12) | 23.1(0.10) |
| Total energy impact, ft.lb (J) | 2.4(3.3) | 2.7(3.7) | 1.8(2.44)* |

*Dart impact (ASTM D-1709; 26 in or 66 cm drop height) for ACHIEVE 3854 film is 47 g/mil (1.85 g/µm)

Blend films, Ex 3-1, 3-2 and 3-3, show superior tear resistance (Elmendorf tear test; ASTM D1922), particularly along the machine direction. Elmendorf tear resistance is not usually a strength for polypropylene films. The values shown by the ACHIEVE 3854 and Ex 5-1 (Ziegler-Natta RCP) controls (about 30 to 35 g/mil along the machine direction) are typical numbers for cast polypropylene films. Against this background, the inventive blend films values of >100 g/mil MD tear resistance were quite unexpected. The inventive films also display outstanding impact strength (total energy impact as measured by a Kayeness total energy impact tester; ASTM D 4272-99), again superior to that of the controls (Ex 5-1 and ACHIEVE 3854). Additionally, the films show favorable tensile properties (ASTM D882) including low film stiffness.

The blend films are compared against Example 5-2 film in Table 10. Example 5-2 (5 MFR, 5 wt % ethylene) is another Ziegler-Natta-based RCP, like Example 5-1, but contains a higher level of ethylene comonomer.

TABLE 10

Cast Film Mechanical Properties [monolayer films]

|  | Ex 3-1 (5.4 wt % ethylene) | Ex 5-2 (5 wt % ethylene) |
|---|---|---|
| Film thickness, mil (µm) | 1.98 (50) | 1.77 (45) |
| MD Ult Tensile, kpsi (MPa) | 6.3 (43.5) | 7.5 (51.8) |
| TD Ult Tensile, kpsi (MPa) | 6.3 (43.5) | 6.4 (44.2) |
| MD Break Elong, % | 700 | 624 |
| TD Break Elong, % | 713 | 643 |
| MD Ten Mod, kpsi (MPa) | 40 (276) | 57 (393) |
| TD Ten Mod, kpsi (MPa) | 37 (255) | 57 (393) |
| MD Elmen tear, g/mil (g/µm) | 125 (4.92) | 53.3 (2.1) |
| TD Elmen tear, g/mil (g/µm) | 323 (12.72) | 180 (7.1) |
| Puncture Resist, lb/mil (g/µm) | 7.9 (141.2) | 6.3 (112.6) |
| Punct Energy, in.lb/mil (J/µm) | 28.5 (0.13) | 14.3 (0.06) |
| total energy impact, ft.lb (J) | >5.7 (>7.7) | — |
| haze, % | 0.7 | 3.1 |
| Gloss at 45°, unit | 90.9 | 77.8 |

From the data in Table 10 it is seen that even at matching total ethylene content, the blend film is more machine direction tear resistant. The inventive blend films, despite being heterogeneous in composition versus random copolymers, show an unexpected favorable properties profile of low haze, high tear resistance, high impact resistance and comparatively low stiffness. The film properties of a Ziegler-Natta impact copolymer would be representative of standard, heterogeneous propylene copolymers. Example 6-1, PP7623 E7, was cast into film on the Black-Clawson cast film line. The film properties are

TABLE 11

Cast Film Mechanical Properties [monolayer film]
Example 6-1 (PP7623 E7 Impact Copolymer)

| Film thickness, mil (µm) | 4.2 (106.7) |
|---|---|
| MD Ult Tensile, kpsi (MPa) | 5.9 (40.7) |
| TD Ult Tensile, kpsi (MPa) | 5.6 (38.9) |
| MD Break Elong, % | 727 |
| TD Break Elong, % | 720 |
| MD Ten Mod, kpsi (MPa) | 82 (566) |
| TD Ten Mod, kpsi (MPa) | 79 (545) |
| MD Elmen tear, g/mil (g/µm) | 63.6 (2.5) |
| TD Elmen tear, g/mil (g/µm) | 81.4 (3.2) |
| Dart Impact ($F_{50}$; 20 in drop), g/mil (g/µm) | 152 (6.0) |
| Total haze, % | 77 |
| Internal haze*, % | 13 |
| Gloss at 45°, unit | 6.5 |

*Internal haze is the haze excluding any film surface contribution. The film surfaces are coated with ASTM approved inert liquids to eliminate any haze contribution from the film surface topology. The haze measurement procedure is per ASTM D 1003.

From the data in Table 11, the heterogeneous Example 6-1 polymer is defensive to the heterogeneous inventive blends with regard to film tear resistance and clarity.

In the literature, Catalloy-based multi-phase Ziegler-Natta propylene polymers were shown to have high tear strength (particularly MD tear resistance). Data can be found in P. Galli's literature article "The Future Role of Ziegler-Natta Catalysts (In-situ Flexible Polyolefinic Alloys)", Proceedings of FLEXPO '96, Houston, Tex., p 113-152, which is incorporated by reference. Data on cast monolayer film from the propylene polymer identified as Adflex™ C 200 F were presented in Table 9 of the referenced literature article. A segment of this data containing the cast film properties on Adflex C 200 F is reproduced in Table 12 below. The only change made to the original data in Table 9 of the referenced literature article is the inclusion of English and/or metric unit values, corresponding to the SI units used in the original table.

TABLE 12

Monolayer Cast Film Properties on Adflex C 200 F as reported in Proceedings of FLEXPO '96, Houston, TX, p 113-152

| | | |
|---|---|---|
| Total thickness, μm (mil) | | 25(1) |
| Puncture, max str. 23 C, N (g) | | 3.3(337) |
| Puncture, deflect. 23 C, cm (inch) | | 1.9(0.75) |
| Dart drop (66 cm), g | | >1500 |
| haze, % | | 21 |

| | MD | TD |
|---|---|---|
| Tensile Modulus, MPa (kpsi) | 80(11.6) | 65(9.4) |
| Stress at yield, MPa (kpsi) | 6.3(0.91) | 5.0(0.72) |
| Elong. at yield, % | 18 | 17 |
| Stress at break, MPa (kpsi) | 32(4.6) | 21(3.0) |
| Elong. at break, % | 700 | 790 |
| Elmendorf tear str., N (g) | 2.5(255) | 3.5(357) |
| Elmendorf tear str., N/μm (g/mil) | 0.1(255) | 0.14(357) |

Adflex C 200 F is a 6 MFR heterogeneous impact copolymer from Basell Polyolefins, Hoofddorp, The Netherlands. The data in Table 12 show the film to be very low in stiffness, suggesting a composition with a significant level of copolymer rubber. While the monolayer film has outstanding tear resistance and impact resistance and good softness (ie. very low film modulus), the film haze is quite high (greater than 20%). On balance, it does not possess the properties profile of low haze, high tear resistance, high impact resistance and comparatively low stiffness of the heterogeneous SAPEC blend examples.

All patents and patent applications, test procedures (such as ASTM methods), and other documents cited herein, including priority documents, are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

The invention claimed is:

1. A film comprising a heterogeneous blend of:
   1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less; and
   2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and or C4 to C10 alpha-olefin comonomers, said semi-amorphous polymers each having:
      a) heat of fusion of 4 to 70 J/g;
      b) a melt flow rate of 0.1 to 200 dg/min;
      c) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
      d) an Mw/Mn of 1.5 to 4,
      e) a propylene triad tacticity, as measured by $^{13}$C NMR, of 75% or greater;
   where the blend has:
      i) a melt flow rate of 0.5 to 100 dg/min; and
      ii) 0 to 5 weight % filler, based upon the weight of the polymers and the filler; and
      iii) a haze of 20% or less measured on a 1 mm thick injection molded chip; and
      iv) a permanent set of greater than 65%; and
   where the film is 0.1 to 25 mil (2.5 to 635 micron) thick and has:
      a haze of 10% or less,
      a 1° Secant tensile modulus of 100,000 to 30,000 psi,
      an Elmendorf tear in the machine direction of 45 g/mil or more,
      an Elmendorf tear in the transverse direction of 45 g/mil or more,
      a total energy impact of 3 J or more; and
      a 45 degree gloss of 82 or more.

2. The film of claim 1 wherein the semi-crystalline polymer comprises propylene and from 1 to 3 weight % of a C2 to C10 alpha olefin comonomer.

3. The film of claim 2 wherein the alpha-olefin comonomer is selected from the group consisting of ethylene, butene, pentene, hexene, heptene, octene, nonene, and decene.

4. The film of claim 2 wherein the alpha-olefin comonomer is selected from the group consisting of ethylene, butene, hexene, and octene.

5. The film of claim 2 wherein the alpha-olefin comonomer is ethylene.

6. The film of claim 1 wherein the semi-crystalline polymer comprises 0 weight % comonomer.

7. The film of any of the above claims wherein the semi-crystalline polymer has a melting point of 120 to 170° C.

8. The film of claim 1 wherein the semi-crystalline polymer has an Mw/Mn between 1.5 and 4.

9. The film of claim 1 wherein the semi-amorphous polymer comprises propylene and from 10 to 20 weight % of a C2 to C10 alpha olefin comonomer.

10. The film of claim 9 wherein the alpha-olefin comonomer is selected from the group consisting of ethylene, butene, pentene, hexene, heptene, octene, nonene, and decene.

11. The film of claim 9 wherein the alpha-olefin comonomer is selected from the group consisting of ethylene, butene, hexene, and octene.

12. The film of claim 9 wherein the alpha-olefin comonomer is ethylene.

13. The film of claim 1 wherein the semi-amorphous polymer has a percent crystallinity of between 2 and 25%.

14. The film of claim 1 wherein the semi-amorphous polymer has a melt flow rate of 1 to 25 dg/min.

15. The film of claim 1 wherein the semi-amorphous polymer has a melting point between 30 and 80° C.

16. The film of claim 1 wherein the semi-amorphous polymer has a tacticity index of from 4 to 12.

17. The film of claim 1 wherein the semi-amorphous polymer has a propylene triad tacticity of 80% or greater.

18. The film of claim 1 wherein the semi-amorphous polymer has a propylene triad tacticity of 85% or greater.

19. The film of claim 1 where the blend has a haze of 15% or less.

20. The film of claim 1 where the blend has a haze of 12% or less.

21. The film of claim 1 wherein the blend has a haze of 10% or less.

22. The film of claim 1 where the film has a gloss of 85 units or more.

23. The film of claim 1 wherein the semi-amorphous polymer comprises from 11 to 25 weight % comonomer and is present at from 15 to 40 weight %, and wherein the blend has dispersions of semi-amorphous polymer less than 4 μm in size in a continuous phase of semi-crystalline polymer and wherein the film has machine direction Elmendorf tear of 60 g/mil (2.4 g/μm) or more, haze of 2% or less, 45 degree gloss of 87 unit or higher, 1% secant tensile modulus of 75,000 psi (517 MPa) or lower, and total energy impact of 3 J or more.

24. The film of claim 1 wherein the semi-amorphous polymer comprises from 11 to 25 weight % comonomer and is present at from 25 to 40 weight %, and wherein the blend has dispersions of semi-amorphous polymer less than 4 μm in size in a continuous phase of semi-crystalline polymer and wherein the film has machine direction Elmendorf tear of 100 g/mil (2.4 g/μm) or more, haze of 1.5% or less, 45 degree gloss of 88 unit or higher, 1% secant tensile modulus of 50,000 psi (517 MPa) or lower, and total energy impact of 7 J or more.

25. The film of claim 1 wherein the blend has a permanent set of 165% or more.

26. The film of claim 1 wherein the blend has a permanent set of 175% or more.

27. The film of claim 1 wherein the blend has a permanent set of 200% or more.

28. The film of claim 1 wherein a 3.18 mm thick injection molded pad of the blend has a resistance to stress whitening of Hunter color ΔL of 20 or less.

29. The film of claim 1 wherein the film has a haze of 4% or less.

30. The film of claim 1 wherein the film has a haze of 3% or less.

31. The film of claim 1 wherein the film has a haze of 2% or less.

32. The film of claim 28 wherein the film has a haze of 5% or less, an MD Elmendorf tear of 50 g/mil or more and a total energy impact of 3 J or more.

33. The film of claim 28 wherein the film has a haze of 2% or less, an MD Elmendorf tear of 100 g/mil or more and a total energy impact of 7 J or more.

34. The film of claim 33 wherein the film has a 45° gloss of 85 units or more.

35. The film of claim 1 wherein the film has a 45° gloss of 90 units or more.

36. The film of claim 1 wherein the film has:
a) a haze of 2% or less;
b) a machine direction tensile strength at break of greater than 40 MPa;
c) a transverse direction tensile strength at break of greater than 40 MPa;
d) a machine direction elongation at break of greater than 500%;
e) a transverse direction elongation at break of greater than 500%;
f) a machine direction Elmendorf tear of 50 to 150 g/mil;
g) a transverse direction Elmendorf tear of 100 to 400 g/mil;
h) a puncture resistance of 6 to 10 lb/mil; and
i) a machine direction tensile modulus of less than 350 MPa.

37. The film of claim 1 where the film is a cast film.

38. The film of claim 1 where the film is a blown film.

39. The film of claim 1 where the film is a laminated film.

40. The film of claim 1 wherein the film is coextruded.

41. The film of claim 1 wherein the film is laminated.

42. The film of claim 1 wherein the film comprises two or more layers.

43. The film of claim 1 wherein the film comprises a core layer comprising the heterogeneous blend.

44. The film of claim 1 wherein the film comprises a skin layer comprising the heterogeneous blend.

45. The film of claim 1 wherein the blend of the semi-amorphous and semi-crystalline polymers further comprises plasticizer.

46. The film of claim 45 wherein the plasticizer comprises poly-alphaolefin.

47. The film of claim 46 wherein the poly-alphaolefin comprises polydecene.

48. The film claim 1 wherein the heterogeneous blend further comprises slip agent.

49. The film of claim 48 wherein the slip agent comprises 50 to 5000 ppm of an amides having the chemical structure $CH_3(CH_2)_7CH=CH(CH_2)_xCONH_2$ where x is 5 to 15.

50. The film of claim 1 wherein the heterogeneous blend further comprises from 10 ppm to 10 weight % of a clarifying agent.

51. The film of claim 50 wherein the clarifying agent comprises 50 to 4000 ppm of an organophosphate, phosphate ester, sodium benzoate, talc, sorbitol, adipic acid, benzoic acid, a metal salts of adipic acid, a metal salt of benzoic acid, an inorganic fillers, or a Ziegler-Natta olefin product or other highly crystalline polymers.

52. The film of claim 50 wherein the clarifying agent comprises 50 to 4000 ppm of a sorbitol-based agent, an aluminum salt based agent, or a sodium salt based agent.

53. The film of claim 50 wherein the clarifying agent comprises 50 to 4000 ppm of disodium[2.2.1]heptane bicyclodicarboxylate, bis(3,4 dimethylbenzylidene)sorbitol, sodium 2,2'-methylene-bis(4,6-di-tert-butylphenyl) phosphate, (p-chloro, p'methyl)dibenzylidene sorbitol, bis(p-ethylbenzylidene)sorbitol, 1,2,3,4-dibenzylidene sorbitol, 1,2,3,4-di-para-methylbenzylidene sorbitol, and or aluminum 2,2'-methylene-bis(4,6-di-tert-butylphenyl)phosphate.

54. A package comprising the film of claim 1.

55. A diaper, medical film or packaging film comprising the film of claim 1.

56. The film of claim 23 wherein the semi-amorphous polymer has a propylene triad tacticity of 85% or greater.

57. The film of claim 1 wherein the semi-amorphous polymer has a propylene triad tacticity of 90% or greater.

58. The film of claim 1 wherein the semi-amorphous polymer has an intermolecular composition distribution of 90% or more by weight of the polymer isolated as one or two adjacent, soluble fractions with the balance of the polymer in immediately preceding or succeeding fractions; and wherein each of these fractions has a weight % comonomer content with a difference of no greater than 10 wt % (relative) of the average weight % comonomer of the copolymer.

59. The film of claim 1 wherein the semi-amorphous polymer has an intermolecular composition distribution of 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative) of the average weight % comonomer of the copolymer.

60. The film of claim 1 wherein the semi-amorphous polymer has an intermolecular composition distribution of 85% or more by weight of the polymer isolated as one or two adjacent, soluble fractions with the balance of the polymer in immediately preceding or succeeding fractions; and wherein each of these fractions has a weight % comonomer content with a difference of no greater than 10 wt % (relative) of the average weight % comonomer of the copolymer.

61. The film of claim 23 wherein the semi-amorphous polymer has an intermolecular composition distribution of 90% or more by weight of the polymer isolated as one or two adjacent, soluble fractions with the balance of the polymer in immediately preceding or succeeding fractions; and wherein each of these fractions has a weight % comonomer content with a difference of no greater than 10 wt % (relative) of the average weight % comonomer of the copolymer.

62. The film of claim 23 wherein the blend has dispersions of semi-amorphous polymer less than 2 μm in size in a continuous phase of semi-crystalline polymer.

63. The film of claim 23 wherein the blend has dispersions of semi-amorphous polymer less than 1 μm in size in a continuous phase of semi-crystalline polymer.

64. The film of claim 24 wherein the blend has dispersions of semi-amorphous polymer less than 2 μm in size in a continuous phase of semi-crystalline polymer.

65. The film of claim 24 wherein the blend has dispersions of semi-amorphous polymer less than 1 μm in size in a continuous phase of semi-crystalline polymer.

66. The film of claim 1 wherein the blend has dispersions of semi-amorphous polymer less than 2 μm in size in a continuous phase of semi-crystalline polymer.

67. The film of claim 1 wherein the blend has dispersions of semi-amorphous polymer less than 1 μm in size in a continuous phase of semi-crystalline polymer.

68. The film of claim 1 wherein the film has a haze of 1% or less.

69. The film of claim 23 wherein the film has a 45° gloss of 85 units or more.

70. The film of claim 23 wherein the film has a 45° gloss of 89 units or more.

71. The film of claim 1 wherein the film is laminated to a substrate.

72. The film of claim 71 where the substrate is a non-woven fabric, paper or a polyolefin.

73. The film of claim 1 wherein a 3.18 mm thick injection molded pad of the blend has a resistance to stress whitening of Hunter color $\Delta L$ of 15 or less.

74. The film of claim 1 wherein a 3.18 mm thick injection molded pad of the blend has a resistance to stress whitening of Hunter color $\Delta L$ of 10 or less.

75. The film of claim 1 wherein a 3.18 mm thick injection molded pad of the blend has a resistance to stress whitening of Hunter color $\Delta L$ of 5 or less.

76. The film of claim 71 where the substrate is selected from the group consisting of wood, cardboard, metals, metal foils, metallized surfaces, glass, and glass coatings.

77. The film of claim 71 where the substrate coated with ink, dye, and or pigment.

* * * * *